(12) United States Patent
Morinaga et al.

(10) Patent No.: US 10,753,300 B2
(45) Date of Patent: Aug. 25, 2020

(54) FLOW RATE DETECTOR

(71) Applicant: Mitsubishi Electric Corporation, Tokyo (JP)

(72) Inventors: Naoki Morinaga, Tokyo (JP); Yuji Ariyoshi, Tokyo (JP); Masahiro Kawai, Tokyo (JP); Shinichiro Hidaka, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 177 days.

(21) Appl. No.: 15/993,829

(22) Filed: May 31, 2018

(65) Prior Publication Data

US 2019/0186400 A1 Jun. 20, 2019

(30) Foreign Application Priority Data

Dec. 20, 2017 (JP) .................. 2017-243783

(51) Int. Cl.
*F02D 41/18* (2006.01)
*F02D 41/28* (2006.01)
(Continued)

(52) U.S. Cl.
CPC ......... *F02D 41/182* (2013.01); *F02D 41/187* (2013.01); *F02D 41/28* (2013.01);
(Continued)

(58) Field of Classification Search
CPC ...... F02D 41/182; F02D 41/187; F02D 41/28; F02D 2041/281; F02D 2041/283;
(Continued)

(56) References Cited

U.S. PATENT DOCUMENTS 6,397,673 B1 * 6/2002 Kanke .................. G01F 1/6965
73/204.11
6,435,023 B1 * 8/2002 Kobayashi ............. G01F 1/699
73/204.25
(Continued)

FOREIGN PATENT DOCUMENTS

JP 54143924 U1 3/1978
JP 06265388 A 9/1994
(Continued)

OTHER PUBLICATIONS

Communication dated Oct. 2, 2018, from Japanese Patent Office in counterpart application No. 2017-243783.

*Primary Examiner* — Freddie Kirkland, III
(74) *Attorney, Agent, or Firm* — Sughrue Mion, PLLC; Richard C. Turner

(57) ABSTRACT

A flow rate detector includes a detection circuit, which is configured to output as an analog signal a voltage in accordance with a flow rate of air flowing through an intake pipe, and a conversion circuit, which is configured to convert the analog signal input from the detection circuit to a digital signal based on an analog-to-digital conversion characteristic to output the digital signal. The analog signal that corresponds to a forward flow direction and is input to the conversion circuit is set to have a value larger than an input voltage range in which a missing code may occur in the analog-to-digital conversion characteristic.

13 Claims, 17 Drawing Sheets

(51) Int. Cl.
  *G01F 1/698* (2006.01)
  *G01F 1/684* (2006.01)
  *G01F 1/692* (2006.01)
  *G01F 5/00* (2006.01)

(52) U.S. Cl.
  CPC ............ *G01F 1/6842* (2013.01); *G01F 1/692* (2013.01); *G01F 1/698* (2013.01); *G01F 5/00* (2013.01); *F02D 2041/281* (2013.01); *F02D 2041/283* (2013.01); *F02D 2041/286* (2013.01)

(58) Field of Classification Search
  CPC ...... F02D 2041/286; G01F 5/00; G01F 1/692; G01F 1/6842; G01F 1/698
  See application file for complete search history.

(56) References Cited

U.S. PATENT DOCUMENTS

| | | | | |
|---|---|---|---|---|
| 7,168,312 | B2* | 1/2007 | Akamatsu | G01F 1/6965 73/204.15 |
| 7,325,449 | B2* | 2/2008 | Ohtsuka | G01F 1/68 73/204.15 |
| 8,806,933 | B2* | 8/2014 | Kohno | G01F 1/699 73/204.15 |
| 8,899,103 | B2* | 12/2014 | Ariyoshi | G01F 5/00 73/114.34 |
| 8,959,995 | B2* | 2/2015 | Otsuka | G01F 1/698 73/204.25 |
| 9,810,561 | B2* | 11/2017 | Hidaka | F02D 41/187 |
| 10,006,792 | B2* | 6/2018 | Morinaga | G01F 1/692 |
| 2002/0056318 | A1* | 5/2002 | Kobayashi | G01F 1/699 73/204.17 |

FOREIGN PATENT DOCUMENTS

| | | |
|---|---|---|
| JP | 09236464 A | 9/1997 |
| JP | 2006200991 A | 8/2006 |
| JP | 5304766 B2 | 10/2013 |
| JP | 2016217755 A | 12/2016 |
| JP | 2017044595 A | 3/2017 |

* cited by examiner

FLOW RATE DETECTOR

BACKGROUND OF THE INVENTION

1. Field of the Invention

The present invention relates to a flow rate detector configured to detect a flow rate of air sucked into an internal combustion engine.

2. Description of the Related Art

In an electronically controlled fuel injection system applied to an internal combustion engine mounted in, for example, a motor vehicle, a flow rate detector configured to detect a mass flow rate of air sucked into the internal combustion engine is widely used. General detection methods of the flow rate detector include a thermal-type detection method and a Karman vortex-type detection method, for example.

A thermal-type flow rate detector is configured to detect a flow rate of air based on a current that is required to be caused to flow through a thermal line to return the temperature of the thermal line that is changed by air flowing around to an original temperature. A Karman vortex-type flow rate detector is configured to detect a flow rate of air based on the generation frequency of a Karman vortex, which is regularly generated alternately on the right and left sides on a downstream side of an object arranged in fluid.

In addition, there is proposed a flow rate detector configured to detect a temperature of air flowing through a flow passage, load a voltage in accordance with the temperature onto an arithmetic processing circuit, and perform signal processing, for example, digital conversion, by an A/D converter (see, for example, Japanese Patent No. 5304766).

The related art described in Japanese Patent No. 5304766 has a configuration in which linear correction of A/D conversion is performed in a circuit in a subsequent stage of the A/D converter in order to prevent detection accuracy from being deteriorated by a nonlinear error of the A/D converter. As a result, the circuit configuration of the flow rate detector is complex.

SUMMARY OF THE INVENTION

The present invention has been made to solve the above-mentioned problem, and it is an object of the present invention to provide a flow rate detector that is capable of enhancing detection accuracy of a flow rate while preventing complication of its circuit configuration.

According to one embodiment of the present invention, there is provided a flow rate detector, which is configured to detect a flow rate of air flowing through an intake pipe for introducing the air into an internal combustion engine, the flow rate detector including: a bypass passage, which is configured to allow part of the air to flow therethough; a detection circuit, which is configured to output as an analog signal a voltage in accordance with a flow rate of the air flowing through the intake pipe by dividing a reference voltage based on a magnitude of the flow rate and whether a flow direction of the air is a forward flow direction or a backward flow direction, the forward flow direction being a direction from the flow rate detector toward the internal combustion engine, the backward flow direction being a direction opposite from the forward flow direction; and a conversion circuit, which is configured to receive as input the analog signal output by the detection circuit, and to convert the input analog signal input into a digital code based on an analog-to-digital conversion characteristic to output the digital code obtained by conversion as a digital signal, the analog-to-digital conversion characteristic being a characteristic obtained by associating an input voltage input to the conversion circuit with the digital code output by the conversion circuit, in which a forward flow analog signal, which is the analog signal that corresponds to the forward flow direction and is input to the conversion circuit, is set to have a value larger than a missing input voltage range, which is an input voltage range in which a missing code is capable of occurring in the analog-to-digital conversion characteristic.

According to the present invention, it is possible to provide the flow rate detector that is capable of enhancing detection accuracy of the flow rate while preventing complication of its circuit configuration.

DESCRIPTION OF THE EMBODIMENTS

Now, a flow rate detector according to exemplary embodiments of the present invention is described with reference to the accompanying drawings. In the illustration of the drawings, the same or corresponding components are denoted by the same reference symbols, and the overlapping description thereof is herein omitted.

First Embodiment

Figure 1:
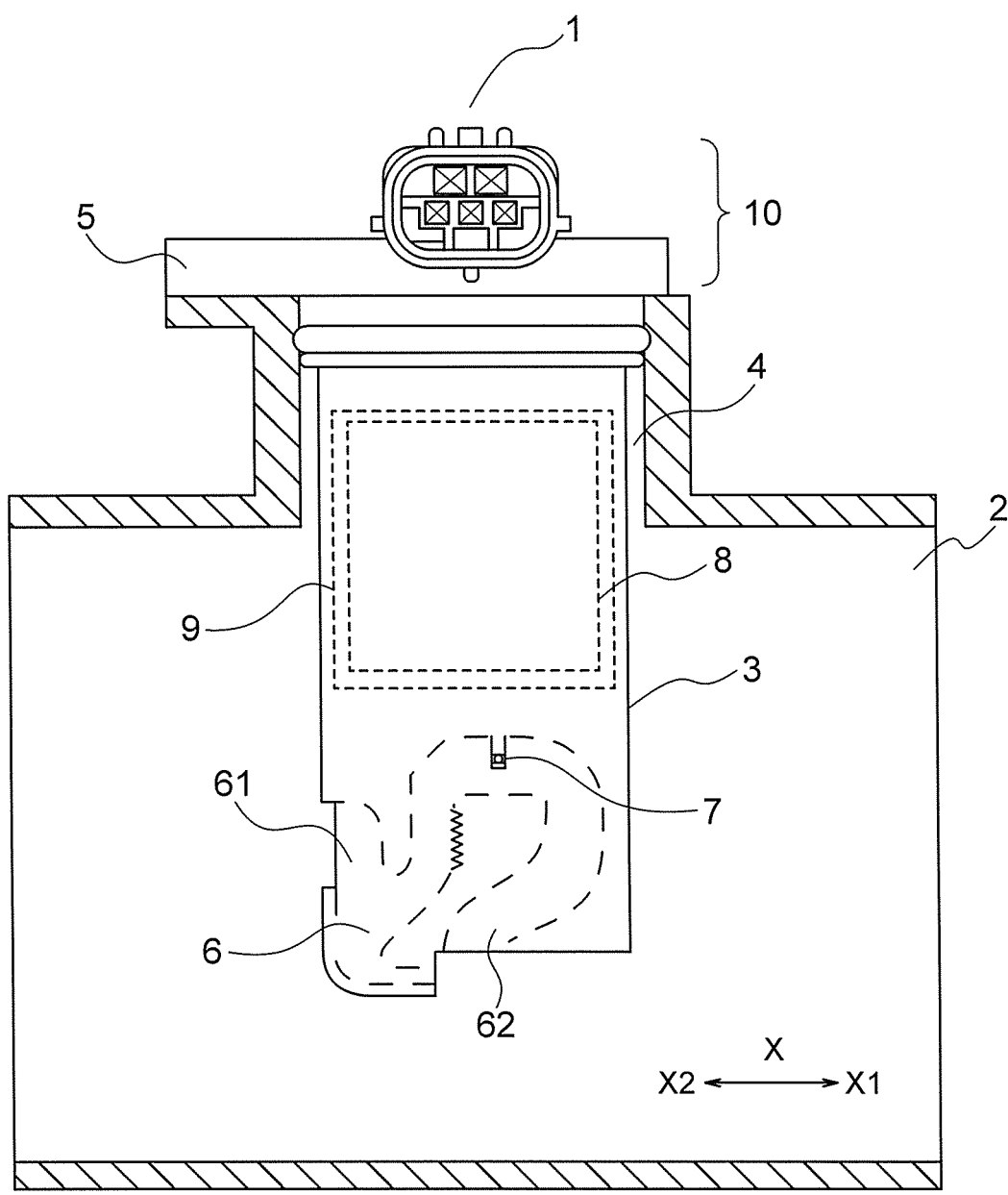
FIG. 1 is a configuration diagram for illustrating a flow rate detector according to a first embodiment of the present invention.

FIG. 1 is a configuration diagram for illustrating a flow rate detector 1 according to a first embodiment of the present invention. In FIG. 1, a side cross section obtained when the flow rate detector 1 mounted to an intake pipe 2 for introducing air into an internal combustion engine is cut on a plane parallel to a flow direction X of the air is illustrated. Further, a direction of the air flowing in the intake pipe 2 from the flow rate detector 1 side to the internal combustion engine side is defined as a forward flow direction X1, and a direction of the air flowing in the intake pipe 2 from the internal combustion engine side to the flow rate detector 1 side, that is, the direction opposite from the forward flow direction X1, is defined as a backward flow direction X2.

In FIG. 1, the flow rate detector 1 includes: a body portion 3, which is inserted into the intake pipe 2 through an insertion hole 4 formed in the intake pipe 2; a flange portion 5, which is fixed to the intake pipe 2; and a connector portion 10, which is formed in the flange portion 5.

In the body portion 3, a bypass passage 6, inside which a flow rate detection element 7 is arranged, a circuit board 8, and a circuit accommodation part 9, which accommodates the circuit board 8, are provided.

The bypass passage 6 is located in the intake pipe 2, and part of the air flowing through the intake pipe 2 flows through the bypass passage 6. That is, the bypass passage 6 takes in part of the air flowing through the intake pipe 2 through an inflow port 61. The air taken in by the bypass passage 6 flows through the bypass passage 6, and then is returned to the intake pipe 2 through an outflow port 62.

The circuit board 8 is accommodated in the circuit accommodation part 9. On the circuit board 8, a detection circuit 15 and a conversion circuit 16, which are to be described later, are mounted. The detection circuit 15 and the conversion circuit 16, which are mounted on the circuit board 8, are electrically connected to an external power source and a control device (not shown) via the connector portion 10. With this configuration, power required for the detection circuit 15 and the conversion circuit 16 to be driven is supplied from the external power source, and the output by the conversion circuit 16 is input to the control device.

Figure 2:
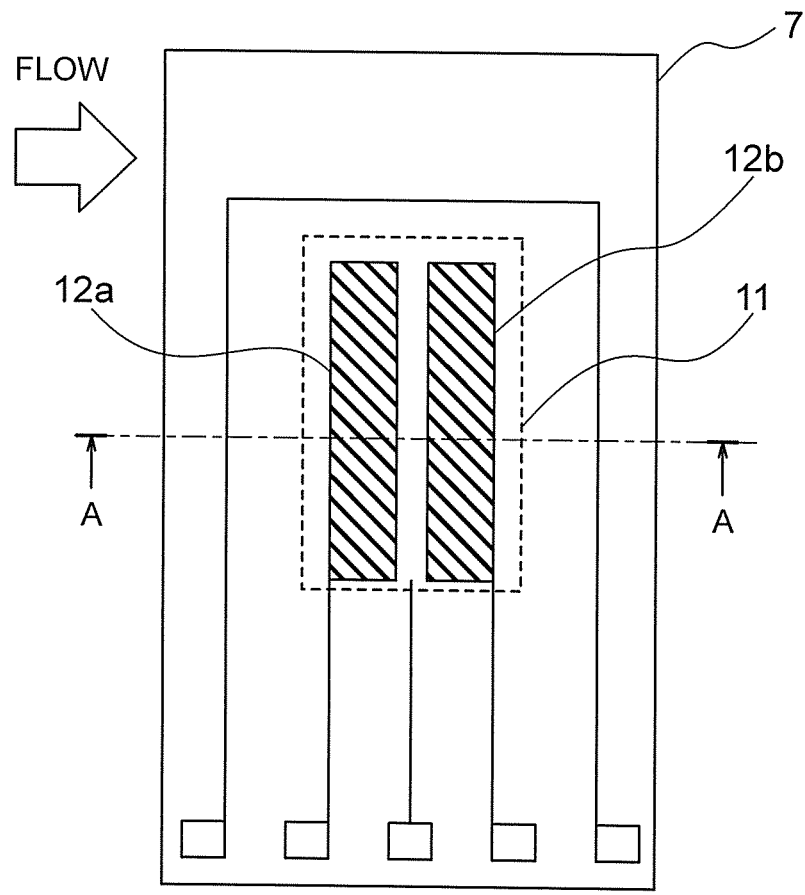
FIG. 2 is a plan view of a flow rate detection element in the first embodiment of the present invention.
Figure 3:
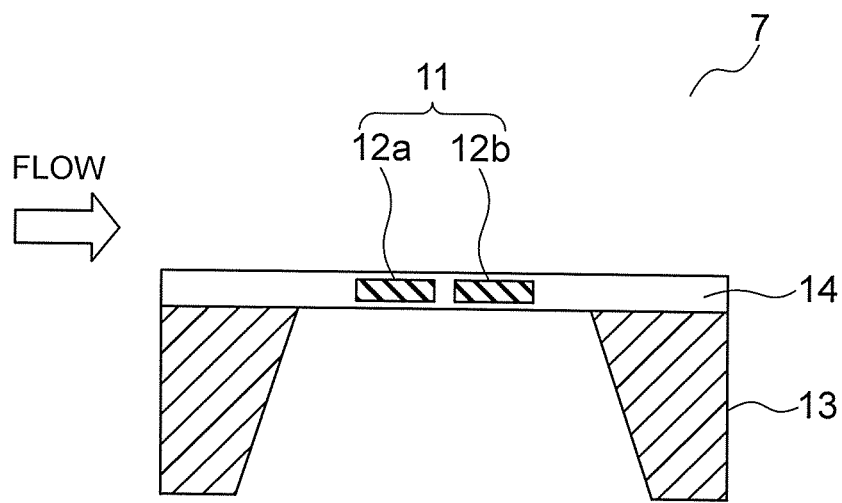
FIG. 3 is a sectional view as viewed from the direction indicated by the arrows A-A of FIG. 2.

Next, description is given of a configuration of the flow rate detection element 7 with reference to FIG. 2 and FIG. 3. FIG. 2 is a plan view of the flow rate detection element 7 in the first embodiment of the present invention. FIG. 3 is a sectional view as viewed from the direction indicated by the arrows A-A of FIG. 2.

In FIG. 2 and FIG. 3, the flow rate detection element 7 includes a detection portion 11, a silicon substrate 13, and an insulating film 14, which is formed on a surface of the silicon substrate 13 to cover the detection portion 11. The detection portion 11 includes a first resistor for flow rate detection (hereinafter simply abbreviated as "resistor") 12a and a second resistor for flow rate detection (hereinafter simply abbreviated as "resistor") 12b. The resistor 12a and the resistor 12b are arranged in the insulating film 14.

As illustrated in FIG. 3, the back surface side of the silicon substrate 13 is removed through etching, for example, and thus the layer in which the resistor 12a and the resistor 12b are formed has a thin film structure.

Figure 4:
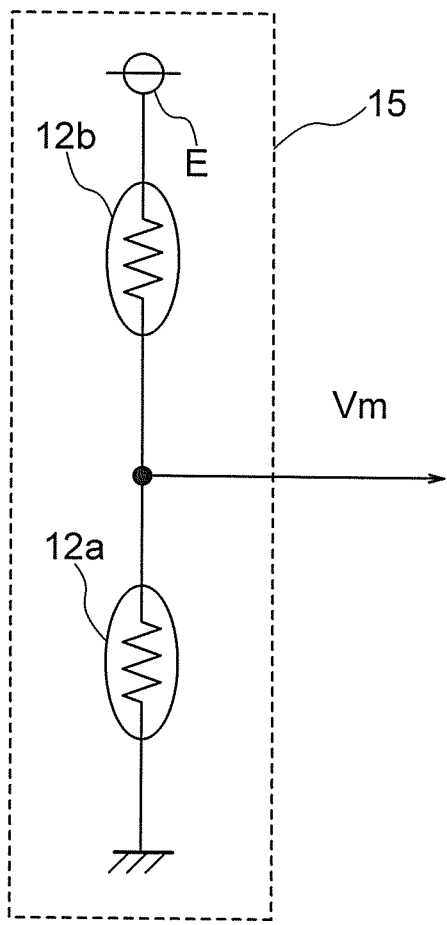
FIG. 4 is a circuit diagram for illustrating a configuration of a detection circuit in the first embodiment of the present invention.
Figure 5:
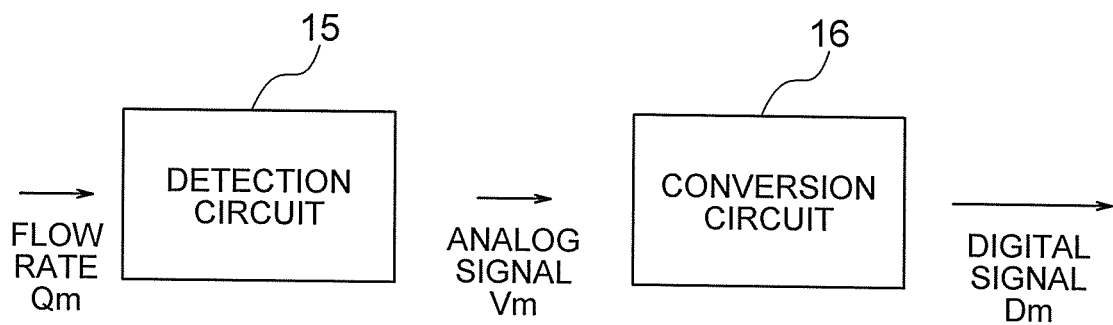
FIG. 5 is a block diagram for illustrating a configuration of the detection circuit and a conversion circuit in the first embodiment of the present invention.

Next, description is given of configurations of the detection circuit 15 and the conversion circuit 16 with reference to FIG. 4 and FIG. 5. FIG. 4 is a circuit diagram for illustrating a configuration of the detection circuit 15 in the first embodiment of the present invention. FIG. 5 is a block diagram for illustrating a configuration of the detection circuit 15 and the conversion circuit 16 in the first embodiment of the present invention.

In FIG. 4, the detection circuit 15 includes a constant voltage source E and a series circuit including the resistor 12a and the resistor 12b. The constant voltage source E outputs a reference voltage Vref. The series circuit has a configuration in which the resistor 12a and the resistor 12b are connected in series to each other. In the series circuit, one terminal is grounded and another terminal is connected to the constant voltage source E.

One terminal of the resistor 12a and one terminal of the resistor 12b are connected in series to each other. Another terminal of the resistor 12a is grounded, and another terminal of the resistor 12b is connected to the constant voltage source E.

Between the resistor 12a, which is located on the upstream side in the bypass passage 6, and the resistor 12b, which is located on the downstream side in the bypass passage 6, a temperature difference in accordance with a flow rate Qm of the air flowing through the intake pipe 2 is generated. With such a temperature difference being generated, a ratio between resistance values of the resistor 12a and the resistor 12b is changed.

Accordingly, the detection circuit 15 is capable of outputting a voltage in accordance with the flow rate Qm as an analog signal Vm by dividing the reference voltage Vref based on a magnitude of the flow rate Qm and whether the flow direction of the air is the forward flow direction X1 or the backward flow direction X2. Specifically, as illustrated in FIG. 4, the detection circuit 15 is configured to output a voltage based on the resistor 12a as the analog signal Vm.

In FIG. 5, the detection circuit 15 outputs the analog signal Vm in accordance with the flow rate Qm. The analog signal Vm output by the detection circuit 15 is input to the conversion circuit 16.

The conversion circuit 16 receives as input the analog signal Vm output by the detection circuit 15, and converts the input analog signal Vm into a digital code based on an analog-to-digital conversion characteristic to output the digital code obtained by conversion as a digital signal Dm. The analog-to-digital conversion characteristic of the conversion circuit 16 is a characteristic obtained by associating an input voltage input to the conversion circuit 16 with the digital code output by the conversion circuit 16.

Figure 6:
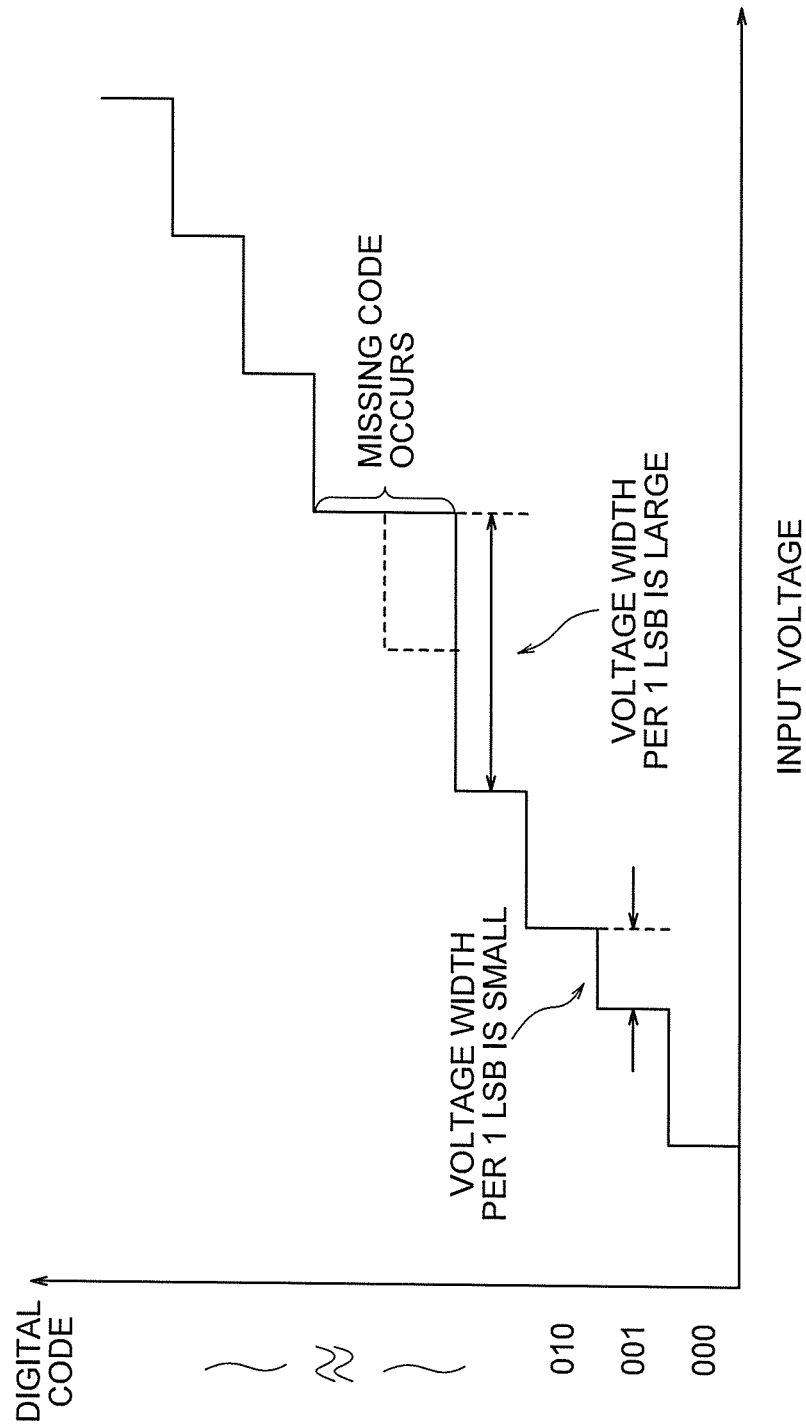
FIG. 6 is a schematic graph for showing an example of an analog-to-digital conversion characteristic of the conversion circuit in the first embodiment of the present invention.

Now, description is given of the analog-to-digital conversion characteristic of the conversion circuit 16 with reference to FIG. 6. FIG. 6 is a schematic graph for showing an example of the analog-to-digital conversion characteristic of the conversion circuit 16 in the first embodiment of the present invention.

In FIG. 6, the horizontal axis indicates the analog signal Vm input to the conversion circuit 16, that is, the input voltage, and the vertical axis indicates the digital code output as the digital signal Dm by the conversion circuit 16 correspondingly to the input voltage. Further, in FIG. 6, an example of the analog-to-digital conversion characteristic in a case where a general conversion error is present in the conversion circuit 16 is shown.

As shown in FIG. 6, with regard to the relationship between the input voltage and the digital code, an input voltage width per 1 LSB, which is the least significant bit, is ideally constant. However, depending on the type of the conversion circuit 16, an input voltage width corresponding to a specific digital code is larger than an input voltage width corresponding to another digital code.

Depending on the input voltage width per 1 LSB, a phenomenon in which a digital code that is to originally be output correspondingly to an input voltage is not output, that is, a missing code, may occur.

In a case where such a conversion error is present in the conversion circuit 16, it is concerned that, even when the analog signal Vm in accordance with the flow rate Qm is input from the detection circuit 15 to the conversion circuit 16, the analog signal Vm is not correctly converted into the digital signal Dm, with the result that detection accuracy of the flow rate Qm is deteriorated.

Figure 7:
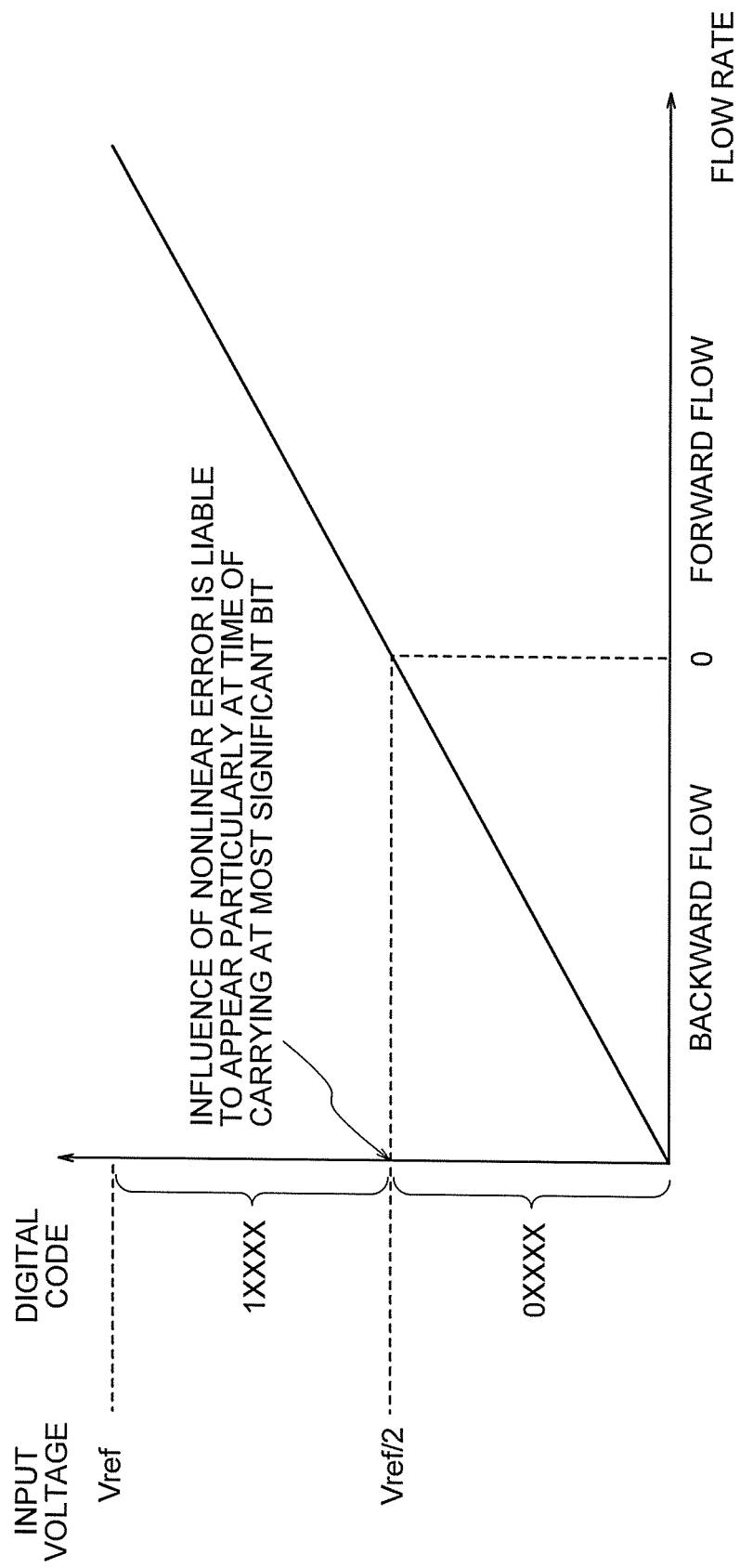
FIG. 7 is a schematic graph for showing an example of a relationship between a flow rate and a digital code in a case in where a general allocation of the flow rate and the digital code is applied to the conversion circuit in the first embodiment of the present invention.

Next, description is given of a relationship between the flow rate Qm and the digital code in a case where a general allocation of the flow rate Qm and the digital code is applied to the conversion circuit 16 with reference to FIG. 7. FIG. 7 is a schematic graph for showing an example of the relationship between the flow rate Qm and the digital code in the case where a general allocation of the flow rate Qm and the digital code is applied to the conversion circuit 16 in the first embodiment of the present invention.

In FIG. 7, the vertical axis indicates both the input voltage input to the conversion circuit 16 correspondingly to the flow rate Qm and the digital code output by the conversion circuit 16 correspondingly to the input voltage, and the horizontal axis indicates the flow rate Qm corresponding to the digital code.

Further, in FIG. 7, in a range of values that can be taken by the digital code, an input voltage corresponding to the maximum is set as the reference voltage Vref, an input voltage corresponding to the minimum is set as zero, and an input voltage corresponding to the boundary at the time of carrying from "0" to "1" at the most significant bit of the digital code is set as a half of the reference voltage Vref.

Further, in FIG. 7, the flow rate Qm indicates the magnitude of the flow rate of the air by the magnitude of the value and the flow direction of the air by the sign of the value. Specifically, the flow rate Qm takes a positive value or a negative value with zero serving as the boundary. When the sign of the flow rate Qm is positive, it indicates that the flow direction of the air is the forward flow direction X1, and when the sign of the flow rate Qm is negative, it indicates that the flow direction of the air is the backward flow direction X2.

As shown in FIG. 7, with the most significant bit serving as the sign of the flow rate, the same gradients of digital codes are allocated in each of the forward flow direction and the backward flow direction. In this case, the digital codes around the carrying from "0" to "1" at the most significant bit are particularly liable to be affected by the nonlinear error. In the example shown in FIG. 7, such a flow rate range liable to be affected by the nonlinear error is a flow rate range in which air hardly flows, that is, a flow rate range in which the flow rate is nearly zero.

Figure 8:
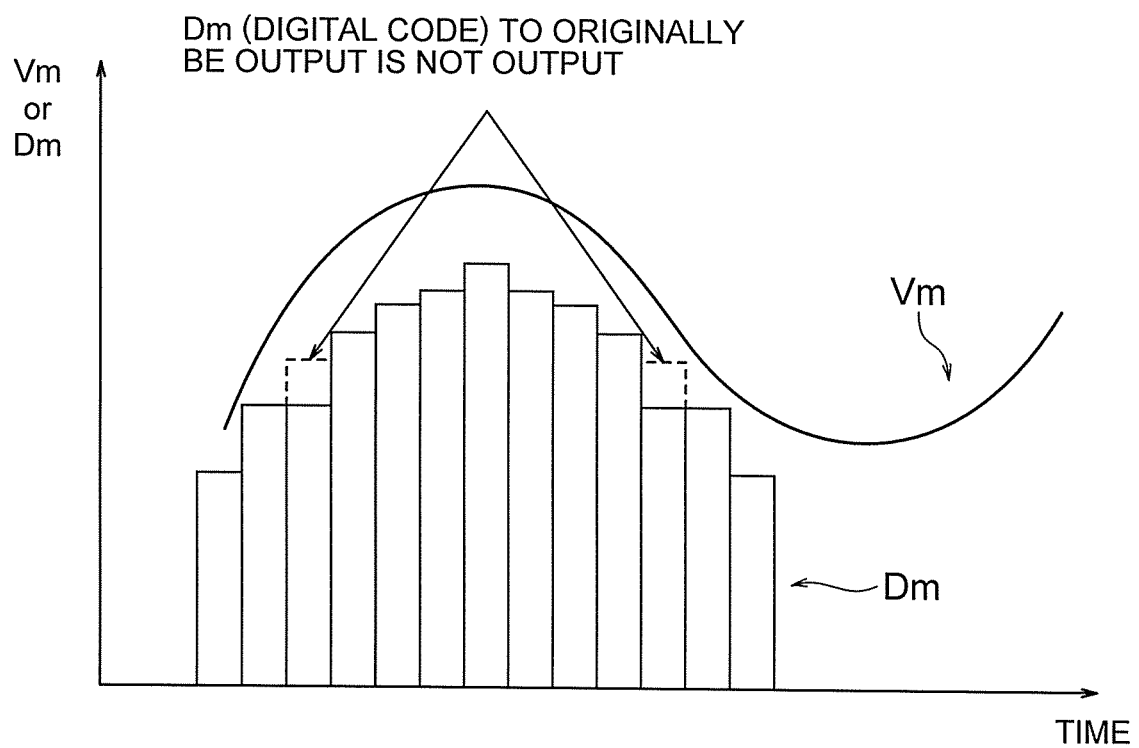
FIG. 8 is a schematic graph for showing an example of a relationship between an analog signal output by the detection circuit and a digital signal output by the conversion circuit in the first embodiment of the present invention.

Next, with reference to FIG. 8, description is given of a relationship between the analog signal Vm and the digital signal Dm in a case where a missing code occurs in the analog-to-digital conversion characteristic of the conversion circuit 16. FIG. 8 is a schematic graph for showing an example of the relationship between the analog signal Vm output by the detection circuit 15 and the digital signal Dm output by the conversion circuit 16 in the first embodiment of the present invention.

As shown in FIG. 8, when the analog signal Vm in accordance with a continuous temporal change of the flow rate is input from the detection circuit 15 to the conversion circuit 16, the conversion circuit 16 outputs the digital code corresponding to the analog signal Vm as the digital signal Dm.

Further, as shown in FIG. 8, when the value of the analog signal Vm is included in a particular input voltage range, a digital code corresponding to the analog signal Vm that is originally to be output is not output by the conversion circuit 16. That is, when the value of the analog signal Vm input from the detection circuit 15 to the conversion circuit 16 is included in such a particular input voltage range, a missing code occurs.

When a missing code occurs, the digital code corresponding to the analog signal Vm that is originally to be output is not output, and hence the detection accuracy of the flow rate Qm is deteriorated. In addition, when the flow rate detector 1 is configured such that advance correction is performed by a signal processing circuit (not shown) in a subsequent stage thereof, the detection accuracy of the flow rate Qm may be further deteriorated.

In view of the consideration described above, the flow rate detector 1 is devised such that the detected flow rate Qm is not affected by a conversion error due to the conversion circuit 16 in an actual-use flow rate range, that is, a range in which the flow direction of the air is the forward flow direction, so as to suppress deterioration of the detection accuracy of the flow rate Qm. Specifically, in the flow rate detector 1, the analog signal Vm (hereinafter referred to as "forward flow analog signal") that corresponds to the forward flow direction and is input to the conversion circuit 16 is set to have a value larger than an input voltage range (hereinafter referred to as "missing input voltage range") in which a missing code may occur in the analog-to-digital conversion characteristic.

For example, when the allocation shown in FIG. 7 is applied to the conversion circuit 16, the missing input voltage range is a voltage range obtained by taking a margin upward and downward with respect to a value that is a half of the reference voltage Vref.

Examples of methods of setting the forward flow analog signal to have a value larger than the missing input voltage range include, for example, a method of adjusting a ratio (hereinafter referred to as "first ratio") between resistance values of the resistor 12a and the resistor 12b included in the detection circuit 15.

Figure 9:
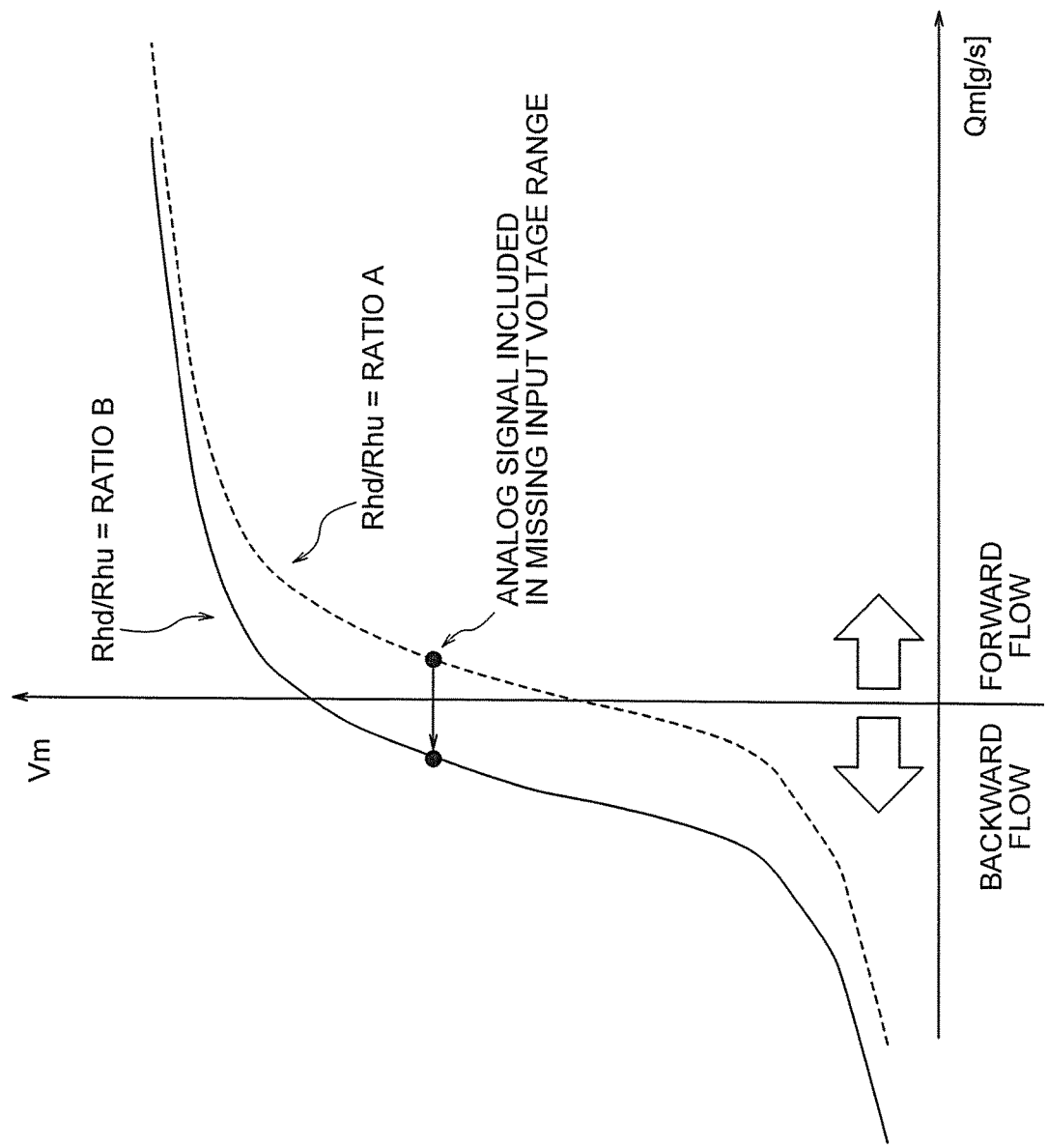
FIG. 9 is a schematic graph for showing an example of a relationship between the flow rate and the analog signal in a case where a ratio between resistance values of a first resistor for flow rate detection and a second resistor for flow rate detection of the detection circuit in the first embodiment of the present invention is changed.

FIG. 9 is a schematic graph for showing an example of a relationship between the flow rate Qm and the analog signal Vm in a case where the ratio between the resistance values of the resistor 12a and the resistor 12b of the detection circuit 15 in the first embodiment of the present invention is changed.

In FIG. 9, the relationship between the flow rate Qm and the analog signal Vm is shown for each of a case in which the first ratio is a ratio A and a case in which the first ratio is a ratio B.

When the resistance value of the resistor 12a is represented by Rhu, the resistance value of the resistor 12b is represented by Rhd, and the reference voltage output by the constant voltage source E is represented by Vref, the analog signal Vm output by the detection circuit 15 is represented by the following expression (1).

$$Vm = Rhu/(Rhu+Rhd) \times Vref \quad (1)$$

From the expression (1), it can be understood that the analog signal Vm is a signal depending on a ratio between Rhu and Rhd, that is, the first ratio.

As shown in FIG. 9, when the first ratio is the ratio A, the analog signal Vm whose value is included in the missing input voltage range corresponds to the forward flow direction. When the first ratio is the ratio B, the analog signal Vm whose value is included in the missing input voltage range corresponds to the backward flow direction.

Accordingly, when the first ratio is the ratio A, the value of the forward flow analog signal may be included in the missing input voltage range depending on the magnitude of the flow rate Qm. That is, when the first ratio is the ratio A, the flow rate Qm detected in the flow rate range in which the flow direction of the air is the forward flow direction may be affected by a conversion error due to the conversion circuit 16.

Meanwhile, when the first ratio is the ratio B, the value of the analog signal Vm corresponding to the backward flow direction may be included in the missing input voltage range depending on the magnitude of the flow rate Qm. However, in this case, the value of the forward flow analog signal is not included in the missing input voltage range irrespective of the magnitude of the flow rate Qm. That is, when the first ratio is the ratio B, the flow rate Qm detected in the flow rate range in which the flow direction of the air is the forward flow direction is not affected by a conversion error due to the conversion circuit 16.

In view of this, the detection circuit 15 is set so that the forward flow analog signal has a value larger than the missing input voltage range by adjusting the first ratio in advance.

With this configuration, it is possible to allocate the digital codes around the carrying from "0" to "1" at the most significant bit only to a flow rate range that does not correspond to the actual-use flow rate range without allocating those digital codes to the actual-use flow rate range. That is, in the actual-use flow rate range, the analog signal Vm whose value is not included in the missing input voltage range is input from the detection circuit 15 to the conversion circuit 16, and thus occurrence of a missing code in the actual-use flow rate range can be suppressed.

Consequently, the detection accuracy of the flow rate Qm can be enhanced only by changing the first ratio without changing the configuration of the conversion circuit 16.

As described above, the flow rate detector according to the first embodiment includes the detection circuit, which is configured to output as an analog signal a voltage in accordance with the flow rate of the air flowing through the intake pipe, and the conversion circuit, which is configured to convert the analog signal input from the detection circuit to a digital signal based on the analog-to-digital conversion characteristic to output the digital signal. Further, the forward flow analog signal, which is an analog signal that corresponds to the forward flow direction and is input to the conversion circuit, is set to have a value larger than the missing input voltage range, which is an input voltage range in which a missing code may occur in the analog-to-digital conversion characteristic.

In the first embodiment, there is exemplified a case in which the ratio between the resistance values of the first resistor for flow rate detection and the second resistor for flow rate detection of the detection circuit is adjusted so that the forward flow analog signal is set to have a value larger than the missing input voltage range.

With this configuration, it is possible to enhance the detection accuracy of the flow rate by eliminating influence of the conversion characteristic of the conversion circuit. Further, in order to enhance the detection accuracy of the flow rate, it is not required to complicate the circuit configuration of the flow rate detector, and hence it is possible to achieve downsizing and cost reduction of the flow rate detector. As described above, it is possible to obtain the flow rate detector capable of enhancing the detection accuracy of the flow rate while preventing complication of its circuit configuration.

Second Embodiment

In a second embodiment of the present invention, description is given of the flow rate detector 1 further including an adjustment circuit 17 in addition to the configuration of the above-mentioned first embodiment. In the second embodiment, description of the same points as those of the above-mentioned first embodiment is omitted, and differences from the above-mentioned first embodiment are mainly described.

As a method of setting the forward flow analog signal to have a value larger than the missing input voltage range, the first ratio is adjusted in the above-mentioned first embodiment, whereas the adjustment circuit 17 is included in the flow rate detector 1 in the second embodiment.

Figure 10:
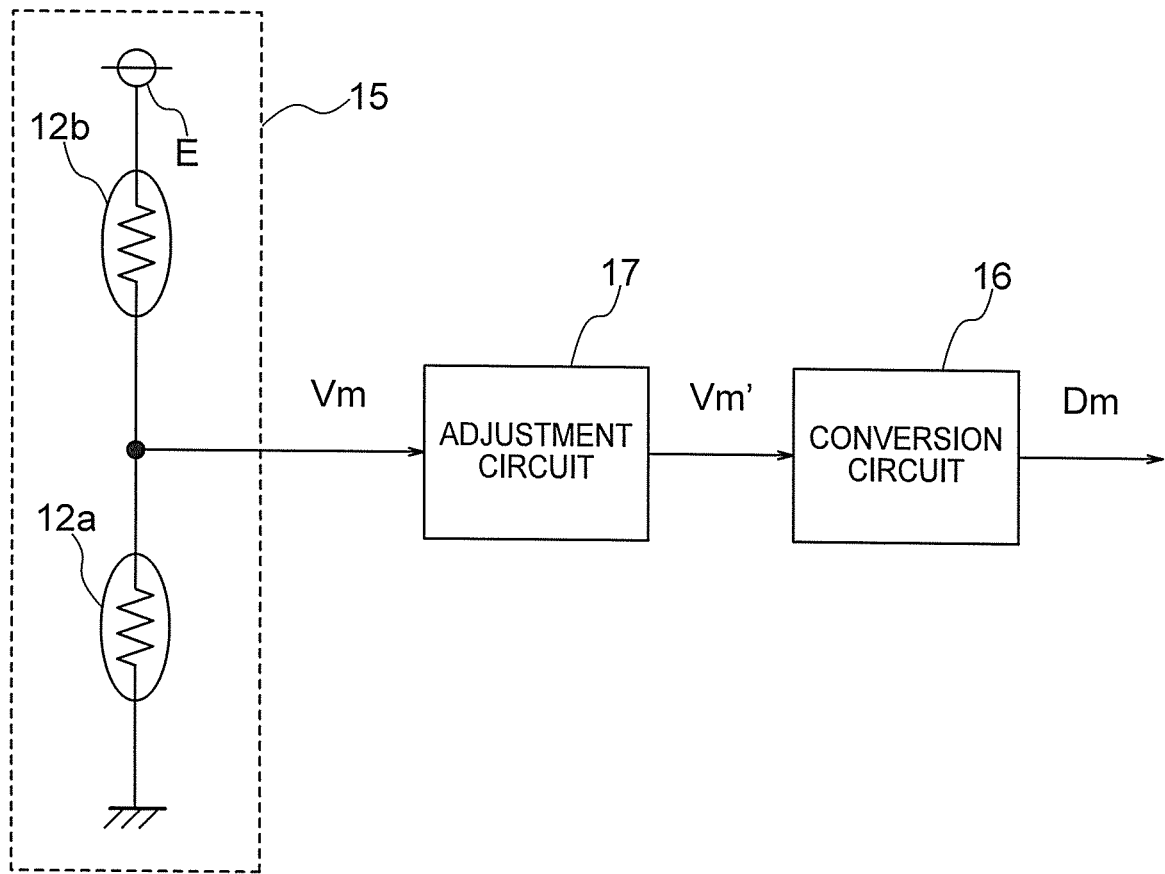
FIG. 10 is a block diagram for illustrating a configuration of a detection circuit, a conversion circuit, and an adjustment circuit in a second embodiment of the present invention.

FIG. 10 is a block diagram for illustrating a configuration of the detection circuit 15, the conversion circuit 16, and the adjustment circuit 17 in the second embodiment of the present invention.

In FIG. 10, the detection circuit 15 outputs the analog signal Vm to the adjustment circuit 17. The adjustment circuit 17 adjusts the analog signal Vm output by the detection circuit 15 so that the forward flow analog signal input to the conversion circuit 16 has a value larger than the missing input voltage range, and outputs the adjusted analog signal Vm to the conversion circuit 16 as an analog signal Vm'. The conversion circuit 16 converts the analog signal Vm' input from the adjustment circuit 17 to the digital signal Dm.

Next, description is given of a configuration example of the adjustment circuit 17. The adjustment circuit 17 is formed of an adder circuit, for example.

The adder circuit offsets the analog signal Vm input from the detection circuit 15 to the positive side to output the offset analog signal Vm as the analog signal Vm'. In other words, the adder circuit outputs the analog signal Vm' obtained by adding a certain offset amount to the analog signal Vm.

Thus, it is possible to set the forward flow analog signal to have a value larger than the missing input voltage range by setting an offset amount of the adder circuit in advance so that the forward flow analog signal input to the conversion circuit 16 has a value larger than the missing input voltage range.

There has been exemplified a case in which the adjustment circuit 17 is formed of the adder circuit, but the present invention is not limited thereto. The adjustment circuit 17 may be formed of an inverting amplifier circuit, for example.

As described above, the flow rate detector according to the second embodiment further includes the adjustment circuit in addition to the configuration of the above-mentioned first embodiment. The conversion circuit is configured to receive as input an analog signal output by the adjustment circuit instead of an analog signal output by the detection circuit to output a digital signal.

With this configuration, it is possible to set the forward flow analog signal to have a value larger than the missing input voltage range with use of the adjustment circuit without adjusting the first ratio by the detection circuit in advance. Further, the analog signal is to be adjusted in a subsequent stage of the detection circuit, and hence, as compared to the above-mentioned first embodiment, the analog signal input to the conversion circuit as well as a variation of the detection circuit can be adjusted with higher accuracy.

Third Embodiment

In a third embodiment of the present invention, description is given of the flow rate detector 1 in which the configuration of the detection circuit 15 is different from that in the above-mentioned first embodiment. In the third embodiment, description of the same points as those of the above-mentioned first embodiment is omitted, and differences from the above-mentioned first embodiment are mainly described.

Figure 11:
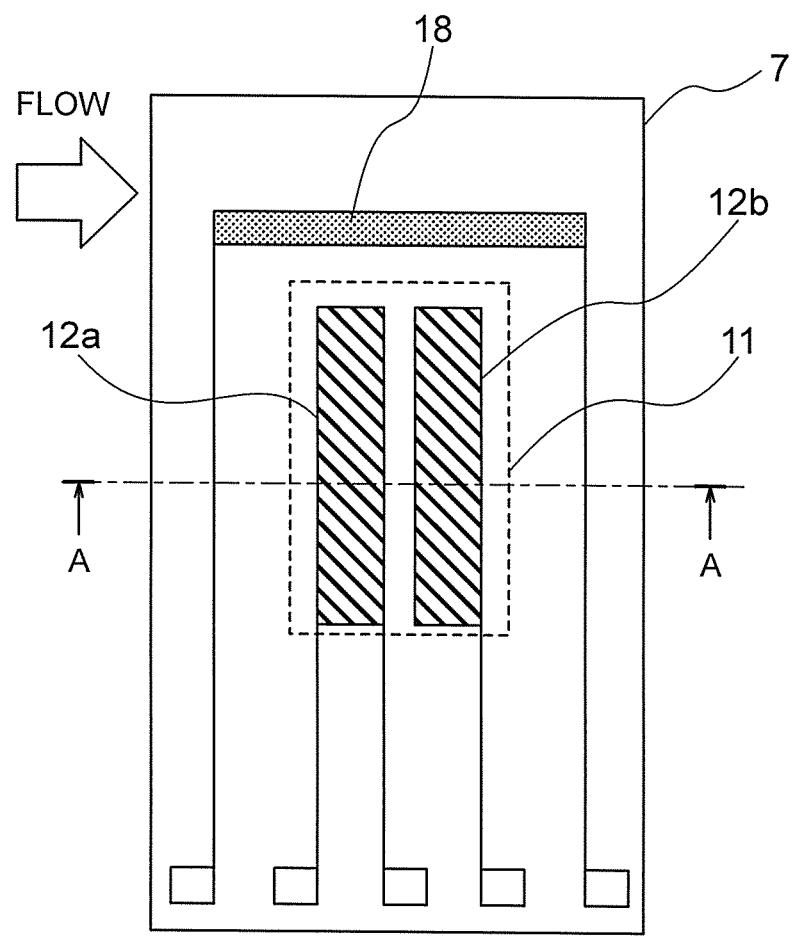
FIG. 11 is a plan view of a flow rate detection element in a third embodiment of the present invention.
Figure 12:
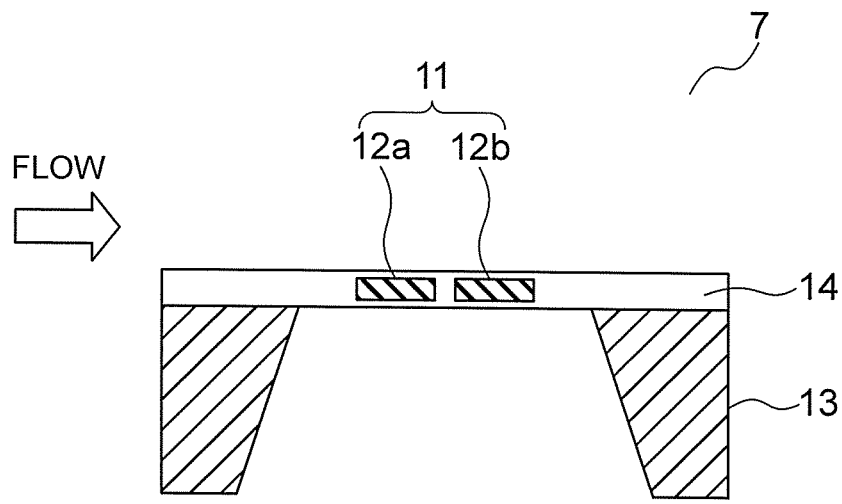
FIG. 12 is a sectional view as viewed from the direction indicated by the arrows A-A of FIG. 11.

FIG. 11 is a plan view of the flow rate detection element 7 in the third embodiment of the present invention. FIG. 12 is a sectional view as viewed from the direction indicated by the arrows A-A of FIG. 11.

In FIG. 11 and FIG. 12, the flow rate detection element 7 includes the detection portion 11, a resistor for air temperature detection (hereinafter simply abbreviated as "resistor") 18, the silicon substrate 13, and the insulating film 14, which is formed on the surface of the silicon substrate 13 to cover the detection portion 11 and the resistor 18. The detection portion 11 includes the resistor 12a and the resistor 12b.

Similarly to the resistor 12a and the resistor 12b, the resistor 18 is a heat-sensitive resistor, and is arranged on a portion of the surface of the flow rate detection element 7 other than a portion of the detection portion 11. The resistor 18 is used for detecting the temperature of the air.

Similarly to the above-mentioned first embodiment, the back surface side of the silicon substrate 13 is removed through etching, for example, and thus the layer in which the resistor 12a and the resistor 12b are formed has a thin film structure.

Figure 13:
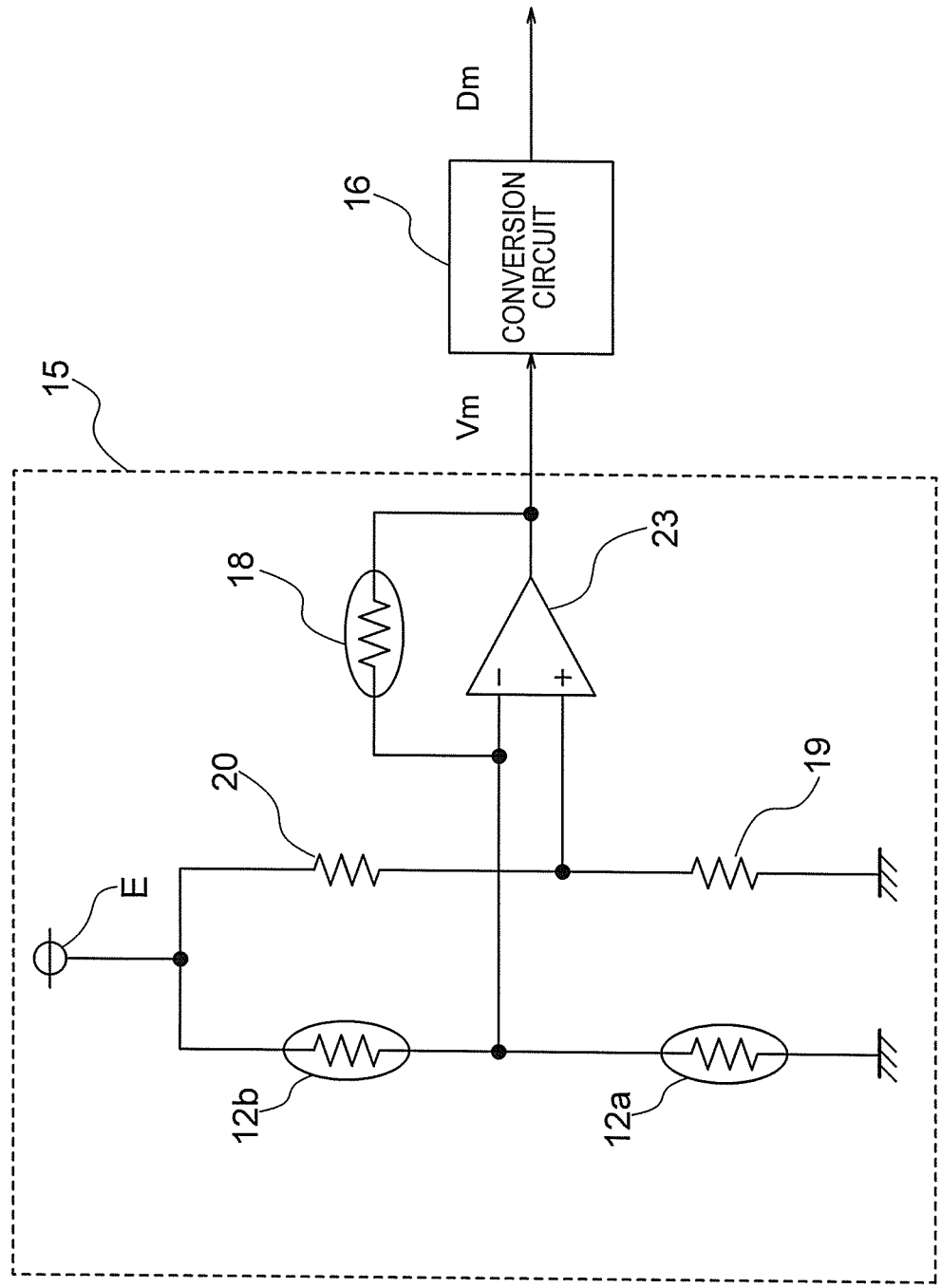
FIG. 13 is a circuit diagram for illustrating a configuration of a detection circuit in the third embodiment of the present invention.

Next, description is given of the configuration of the detection circuit 15 with reference to FIG. 13. FIG. 13 is a circuit diagram for illustrating the configuration of the detection circuit 15 in the third embodiment of the present invention.

In FIG. 13, the detection circuit 15 includes: the constant voltage source E; a first series circuit, which includes a fixed resistor 19 and a fixed resistor 20; a second series circuit, which includes the resistor 12a and the resistor 12b; an operational amplifier 23; and the resistor 18. The first series circuit has a configuration in which the fixed resistor 19 and the fixed resistor 20 are connected in series to each other. The second series circuit has a configuration in which the resistor 12a and the resistor 12b are connected in series to each other.

In each of the first series circuit and the second series circuit, one terminal is grounded and another terminal is connected to the constant voltage source E. That is, the resistor 12a and the fixed resistor 19 are grounded, and a node of the resistor 12b and the fixed resistor 20 is connected to the constant voltage source E.

A non-inverting input terminal of the operational amplifier 23 is connected to a node of the fixed resistor 19 and the fixed resistor 20, and an inverting input terminal of the operational amplifier 23 is connected to a node of the resistor 12a and the resistor 12b. One terminal of the resistor 18 is connected to the inverting input terminal side of the operational amplifier 23, and another terminal of the resistor 18 is connected to an output side of the operational amplifier 23. The detection circuit 15 is configured to output, as the analog signal Vm, output of the operational amplifier 23.

With this configuration of the detection circuit 15, an intermediate potential of the first series circuit and an intermediate potential of the second series circuit are input to the non-inverting input terminal and the inverting input terminal of the operational amplifier 23, respectively. Further, the output of the operational amplifier 23 is fed back to the inverting input terminal of the operational amplifier 23 via the resistor 18.

A heating current Ihu and a heating current Ihd flow through the resistor 12a and the resistor 12b, respectively, with the result that Joule heat is generated. When air flows over the detection portion 11, the resistor 12a, which is located on the upstream side, is cooled more as compared to the resistor 12b, which is located on the downstream side. For that reason, in the detection circuit 15, the output of the operational amplifier 23, that is, the analog signal Vm output by the detection circuit 15, changes so that a potential $V_-$ at the node of the resistor 12a and the resistor 12b changes to become equal to a potential $V_+$ at the node of the fixed resistor 19 and the fixed resistor 20.

Thus, the flow rate Qm can be detected through confirmation of the analog signal Vm. The analog signal Vm output by the detection circuit 15 is represented by the following expression (2). In the expression (2), an amplification degree of the operational amplifier 23 is represented by A, a voltage at the non-inverting input terminal of the operational amplifier 23 is represented by $V_+$, and a voltage at the inverting input terminal of the operational amplifier 23 is represented by $V_-$.

$$Vm = A \times (V_- - V_-) \tag{2}$$

As described above, $V_-$ represents the potential at the node of the resistor 12a and the resistor 12b, and thus can be changed by adjusting the ratio of the resistance values of the resistor 12a and the resistor 12b, that is, the first ratio. As can be understood from the expression (2), the analog signal Vm can be changed by changing $V_-$.

That is, also when the detection circuit 15 has the configuration illustrated in FIG. 13, similarly to the above-mentioned first embodiment, the forward flow analog signal can be set to have a value larger than the missing input voltage range by adjusting the first ratio in advance.

Consequently, even without changing the configuration of the conversion circuit 16, similarly to the above-mentioned first embodiment, the detection accuracy of the flow rate Qm can be enhanced only by changing the first ratio. In addition, in the detection circuit 15 illustrated in FIG. 13, a configuration of a differential amplifier circuit using the operational amplifier 23 is employed, and hence it is possible to obtain the analog signal Vm that is more sensitive to changes of the flow rate Qm as compared to that in the above-mentioned first embodiment.

As described above, according to the flow rate detector of the third embodiment, in the detection circuit illustrated in FIG. 13, the forward flow analog signal is set to have a value larger than the missing input voltage range by adjusting the ratio between the resistance values of the first resistor for flow rate detection and the second resistor for flow rate detection.

Also with this configuration, the same effects as those of the above-mentioned first embodiment can be obtained. Moreover, it is possible to achieve the flow rate detector that is more sensitive to changes of the flow rate of the air as compared to the above-mentioned first embodiment.

Fourth Embodiment

In a fourth embodiment of the present invention, description is given of the flow rate detector 1 further including the adjustment circuit 17 in addition to the configuration of the above-mentioned third embodiment. In the fourth embodiment, description of the same points as those of the above-mentioned third embodiment is omitted, and differences from the above-mentioned third embodiment are mainly described.

As a method of setting the forward flow analog signal to have a value larger than the missing input voltage range, the first ratio is adjusted in the above-mentioned third embodiment, whereas the adjustment circuit 17 is included in the flow rate detector 1 in the fourth embodiment.

Figure 14:
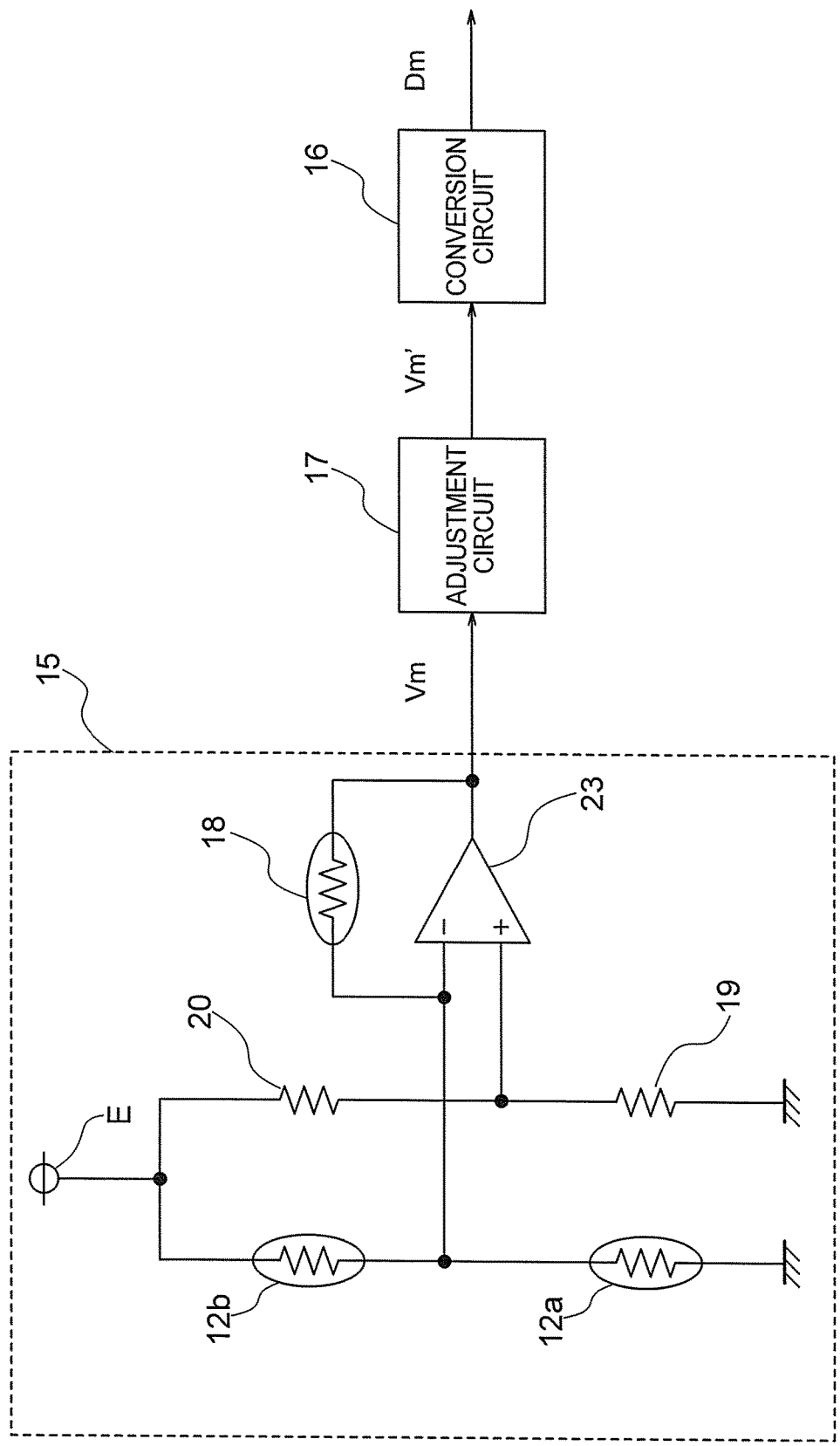
FIG. 14 is a block diagram for illustrating a configuration of a detection circuit, a conversion circuit, and an adjustment circuit in a fourth embodiment of the present invention.

FIG. 14 is a block diagram for illustrating a configuration of the detection circuit 15, the conversion circuit 16, and the adjustment circuit 17 in the fourth embodiment of the present invention.

In FIG. 14, the detection circuit 15 outputs the analog signal Vm to the adjustment circuit 17. The adjustment circuit 17 outputs the analog signal Vm' to the conversion circuit 16. The conversion circuit 16 converts the analog signal Vm' input from the adjustment circuit 17 to the digital signal Dm.

The configuration of the adjustment circuit 17 is the same as that of the above-mentioned second embodiment. Consequently, as illustrated in FIG. 14, similarly to the above-mentioned second embodiment, the forward flow analog signal can be set to have a value larger than the missing input voltage range by providing the adjustment circuit 17 to the configuration illustrated in FIG. 13.

As described above, the flow rate detector according to the fourth embodiment further includes the adjustment circuit in addition to the configuration of the above-mentioned third embodiment. The conversion circuit is configured to receive as input an analog signal output by the adjustment circuit instead of an analog signal output by the detection circuit to output a digital signal.

With this configuration, it is possible to set the forward flow analog signal to have a value larger than the missing input voltage range with use of the adjustment circuit without adjusting the first ratio by the detection circuit in advance. Further, the analog signal is to be adjusted in a subsequent stage of the detection circuit, and hence, as compared to the above-mentioned third embodiment, the analog signal input to the conversion circuit as well as a variation of the detection circuit can be adjusted with higher accuracy.

Fifth Embodiment

In a fifth embodiment of the present invention, description is given of the flow rate detector 1 in which the configuration of the detection circuit 15 is different from those in the above-mentioned first and third embodiments. In the fifth embodiment, description of the same points as those of the above-mentioned first and third embodiments is omitted, and differences from the above-mentioned first and third embodiments are mainly described.

Figure 15:
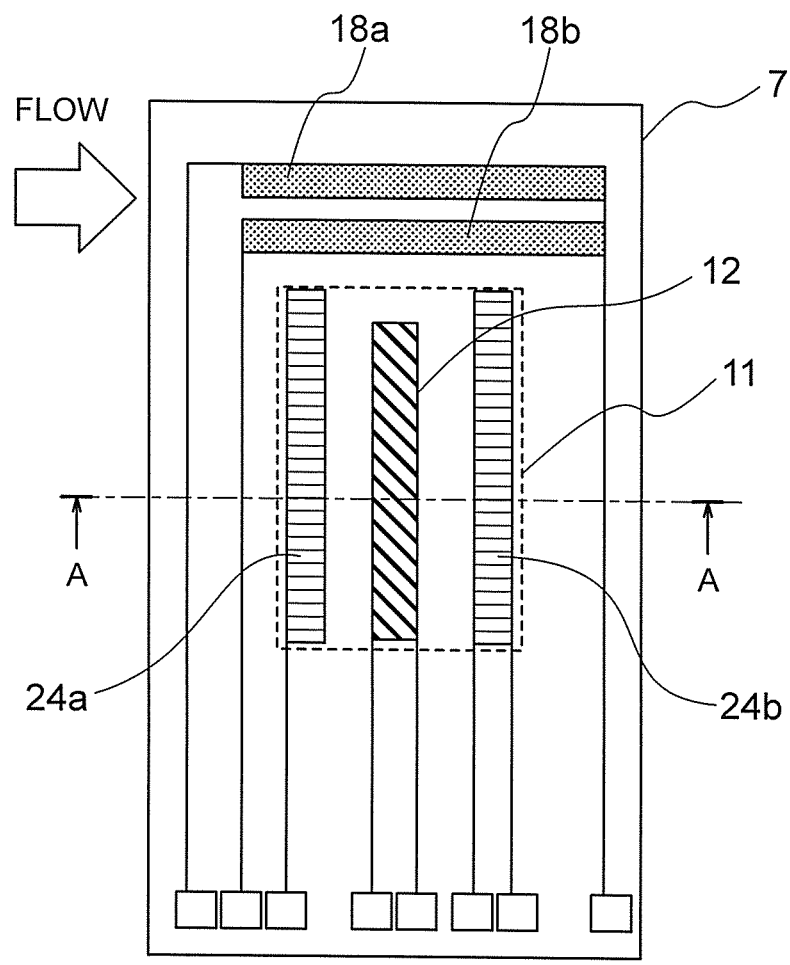
FIG. 15 is a plan view of a flow rate detection element in a fifth embodiment of the present invention.
Figure 16:
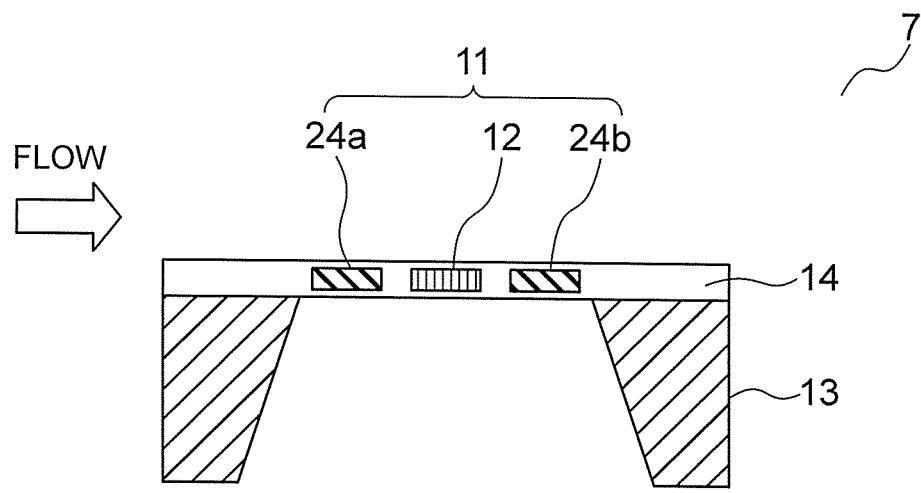
FIG. 16 is a sectional view as viewed from the direction indicated by the arrows A-A of FIG. 15.

FIG. 15 is a plan view of the flow rate detection element 7 in the fifth embodiment of the present invention. FIG. 16 is a sectional view as viewed from the direction indicated by the arrows A-A of FIG. 15.

In FIG. 15 and FIG. 16, the flow rate detection element 7 includes the detection portion 11, a first resistor for air temperature detection (hereinafter simply abbreviated as "resistor") 18a, a second resistor for air temperature detection (hereinafter simply abbreviated as "resistor") 18b, the silicon substrate 13, and the insulating film 14, which is formed on the surface of the silicon substrate 13 to cover the detection portion 11, the first resistor 18a, and the second resistor 18b. The detection portion 11 includes a resistor for flow rate detection (hereinafter simply abbreviated as "resistor") 12, a first resistor for temperature detection (hereinafter simply abbreviated as "resistor") 24a, and a second resistor for temperature detection (hereinafter simply abbreviated as "resistor") 24b.

The resistor 18a and the resistor 18b are heat-sensitive resistors, and are arranged on a portion of the surface of the flow rate detection element 7 other than a portion of the detection portion 11. The resistor 18a and the resistor 18b are used for detecting the temperature of the air. The resistor 24a and the resistor 24b are used for detecting the temperature of the resistor 12.

In the insulating film 14, the resistor 24a, the resistor 12, and the resistor 24b are formed along the forward flow direction. Similarly to the above-mentioned first embodiment, the back surface side of the silicon substrate 13 is removed through etching, for example, and thus the layer in which the resistor 24a, the resistor 12, and the resistor 24b are formed has a thin film structure.

Figure 17:
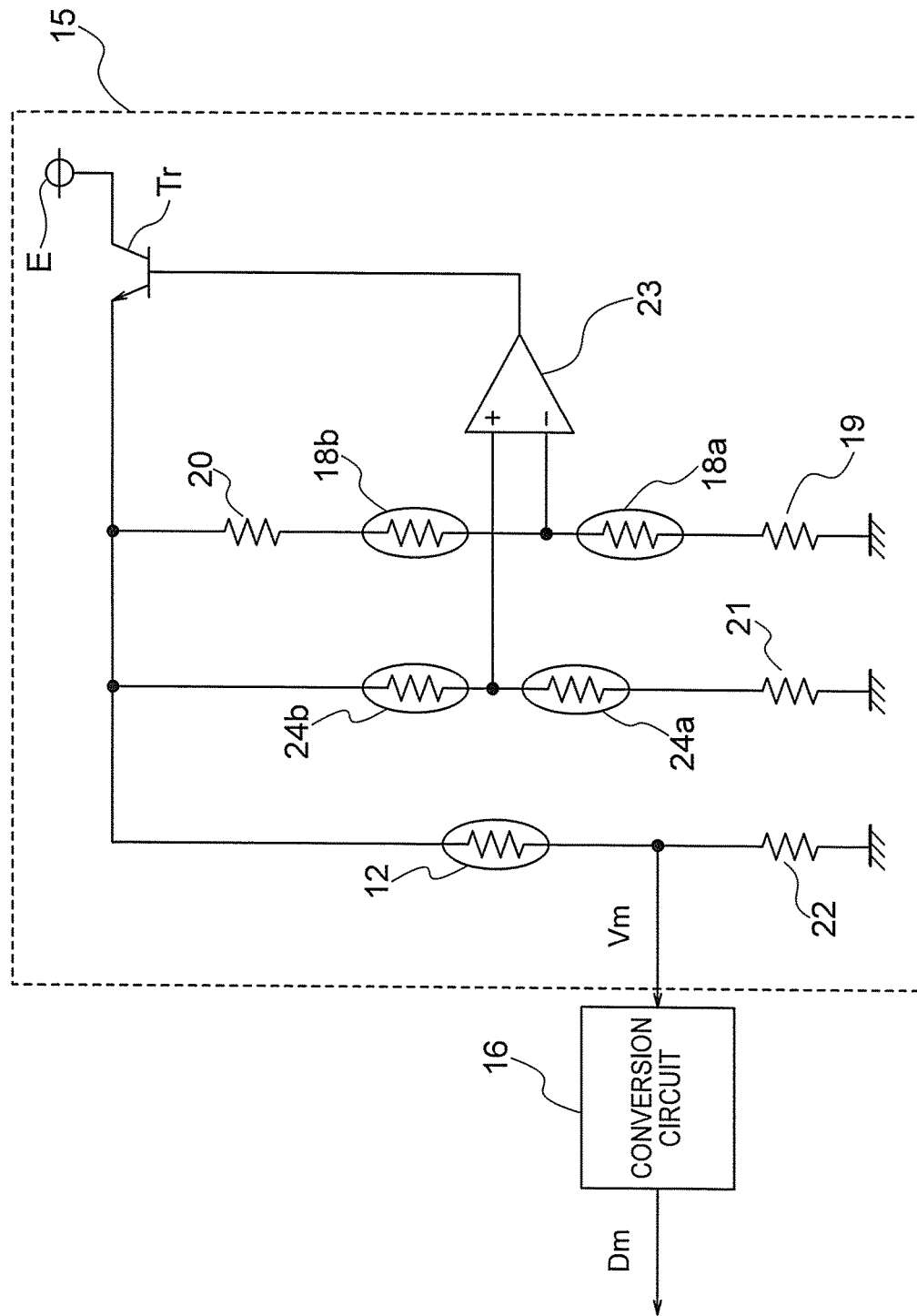
FIG. 17 is a circuit diagram for illustrating a configuration of a detection circuit in the fifth embodiment of the present invention.

Next, description is given of the configuration of the detection circuit 15 with reference to FIG. 17. FIG. 17 is a circuit diagram for illustrating the configuration of the detection circuit 15 in the fifth embodiment of the present invention.

In FIG. 17, the detection circuit 15 includes: the constant voltage source E; a first series circuit, which includes the fixed resistor 19, the resistor 18a, the resistor 18b, and the fixed resistor 20; a second series circuit, which includes the fixed resistor 21, the resistor 24a, and the resistor 24b; a third series circuit, which includes the fixed resistor 22 and the resistor 12; the operational amplifier 23; and a transistor Tr.

The first series circuit has a configuration in which the fixed resistor 19, the resistor 18a, the resistor 18b, and the fixed resistor 20 are connected in series to each other. The second series circuit has a configuration in which the fixed resistor 21, the resistor 24a, and the resistor 24b are connected in series to each other. The third series circuit has a configuration in which the fixed resistor 22 and the resistor 12 are connected in series to each other. In each of the first series circuit, the second series circuit, and the third series circuit, one terminal is grounded and another terminal is connected to an emitter side of the transistor Tr.

The non-inverting input terminal of the operational amplifier 23 is connected to a node of the resistor 24a and the resistor 24b, and the inverting input terminal of the operational amplifier 23 is connected to a node of the resistor 18a and the resistor 18b. A base side of the transistor Tr is connected to the output side of the operational amplifier 23, and a collector side of the transistor Tr is connected to the constant voltage source E. The detection circuit 15 is configured to output a voltage based on the fixed resistor 22 as the analog signal Vm.

With this configuration of the detection circuit 15, an intermediate potential of the first series circuit and an intermediate potential of the second series circuit are input to the non-inverting input terminal and the inverting input terminal of the operational amplifier 23, respectively. Further, a voltage based on a difference between the intermediate potential input to the inverting input terminal and the intermediate potential input to the non-inverting input terminal is output from the operational amplifier 23, and is fed back to upper ends of the first series circuit and the second series circuit.

At this time, a heating current Ih flows through the resistor 12, with the result that Joule heat is generated. As illustrated in FIG. 15 and FIG. 16, the resistor 12 is arranged in the proximity of the resistor 24a and the resistor 24b, and hence the temperature of the resistor 24a and the resistor 24b becomes equal to the temperature of the resistor 12. In addition, the detection circuit 15 has a configuration in which the temperature of the resistor 24a and the resistor 24b is kept higher than the temperature of the resistor 18a and the resistor 18b by a fixed temperature.

As the flow rate of the air flowing over the detection portion 11 increases, a heat transfer amount from the resistor 12 to the air increases. For that reason, in order for the temperature of the resistor 12, the resistor 24a, and the resistor 24b to be kept higher than the temperature of the resistor 18a and the resistor 18b by a fixed temperature, the heating current Ih depending on the flow rate Qm is required.

Thus, the flow rate Qm can be detected by causing the voltage based on the fixed resistor 22 corresponding to the heating current Ih to be output as the analog signal Vm. In this case, the analog signal Vm output by the detection circuit 15 can be represented by the above-mentioned expression (2).

It is possible to change $V_-$ shown in the expression (2) by adjusting a ratio (hereinafter referred to as "second ratio") of resistance values of the resistor 18a, the resistor 18b, the fixed resistor 19, and the fixed resistor 20, which are included in the first series circuit, which is connected to the inverting input terminal of the operational amplifier. As can be understood from the expression (2), the analog signal Vm can be changed by changing $V_-$.

That is, also when the detection circuit 15 has the configuration illustrated in FIG. 17, similarly to the above-mentioned first embodiment, the forward flow analog signal can be set to have a value larger than the missing input voltage range by adjusting the second ratio in advance. Consequently, even without changing the configuration of the conversion circuit 16, similarly to the above-mentioned first embodiment, the detection accuracy of the flow rate Qm can be enhanced only by changing the second ratio.

As described above, according to the flow rate detector of the fifth embodiment, in the detection circuit illustrated in FIG. 17, the forward flow analog signal is set to have a value larger than the missing input voltage range by adjusting the ratio of the resistance values of the first resistor for air temperature detection, the second resistor for air temperature detection, the first fixed resistor, and the second fixed resistor.

Also with this configuration, the same effects as those of the above-mentioned first embodiment can be obtained. Moreover, it is possible to achieve the flow rate detector that is more sensitive to changes of the flow rate of the air as compared to the above-mentioned first embodiment.

Sixth Embodiment

In a sixth embodiment of the present invention, description is given of the flow rate detector 1 further including the adjustment circuit 17 in addition to the configuration of the above-mentioned fifth embodiment. In the sixth embodiment, description of the same points as those of the above-mentioned first embodiment is omitted, and differences from the above-mentioned fifth embodiment are mainly described.

As a method of setting the forward flow analog signal to have a value larger than the missing input voltage range, the second ratio is adjusted in the above-mentioned fifth embodiment, whereas the adjustment circuit 17 is included in the flow rate detector 1 in the sixth embodiment.

Figure 18:
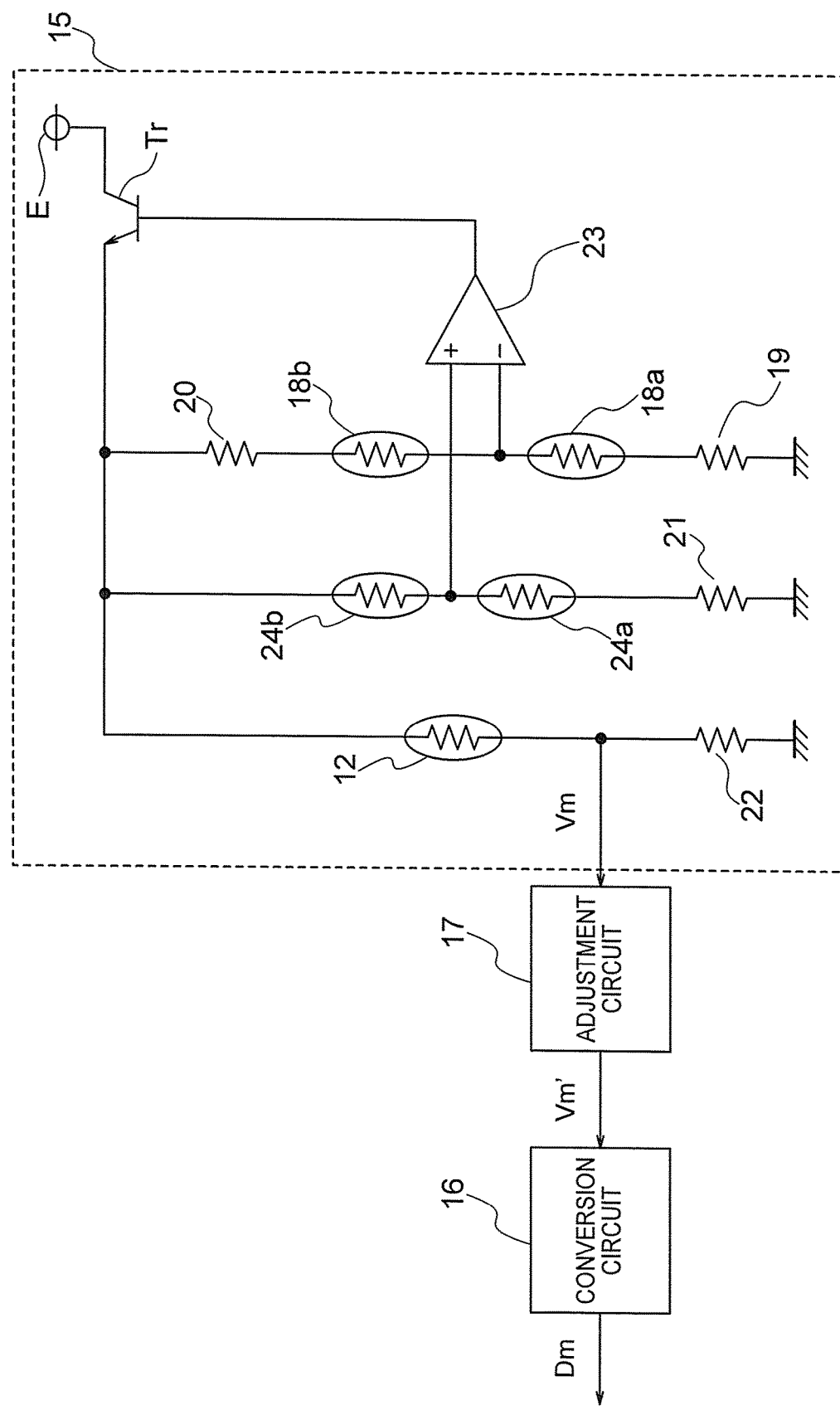
FIG. 18 is a block diagram for illustrating a configuration of a detection circuit, a conversion circuit, and an adjustment circuit in a sixth embodiment of the present invention.

FIG. 18 is a block diagram for illustrating a configuration of the detection circuit 15, the conversion circuit 16, and the adjustment circuit 17 in the sixth embodiment of the present invention.

In FIG. 18, the detection circuit 15 outputs the analog signal Vm to the adjustment circuit 17. The adjustment circuit 17 outputs the analog signal Vm' to the conversion circuit 16. The conversion circuit 16 converts the analog signal Vm' input from the adjustment circuit 17 to the digital signal Dm.

The configuration of the adjustment circuit 17 is the same as that of the above-mentioned second embodiment. Consequently, as illustrated in FIG. 18, similarly to the above-mentioned second embodiment, the forward flow analog signal can be set to have a value larger than the missing input voltage range by providing the adjustment circuit 17 to the configuration illustrated in FIG. 17.

As described above, the flow rate detector according to the sixth embodiment further includes the adjustment circuit in addition to the configuration of the above-mentioned fifth embodiment. The conversion circuit is configured to receive as input an analog signal output by the adjustment circuit instead of an analog signal output by the detection circuit to output a digital signal.

With this configuration, it is possible to set the forward flow analog signal to have a value larger than the missing input voltage range with use of the adjustment circuit without adjusting the second ratio by the detection circuit in advance. Further, the analog signal is to be adjusted in a subsequent stage of the detection circuit, and hence, as compared to the above-mentioned fifth embodiment, the analog signal input to the conversion circuit as well as a variation of the detection circuit can be adjusted with higher accuracy.

Seventh Embodiment

In a seventh embodiment of the present invention, description is given of the flow rate detector 1 in which the configuration of the detection circuit 15 is different from those in the above-mentioned first, third, and fifth embodiments. In the seventh embodiment, description of the same points as those of the above-mentioned first, third, and fifth embodiments is omitted, and differences from the above-mentioned first, third, and fifth embodiments are mainly described.

Figure 19:
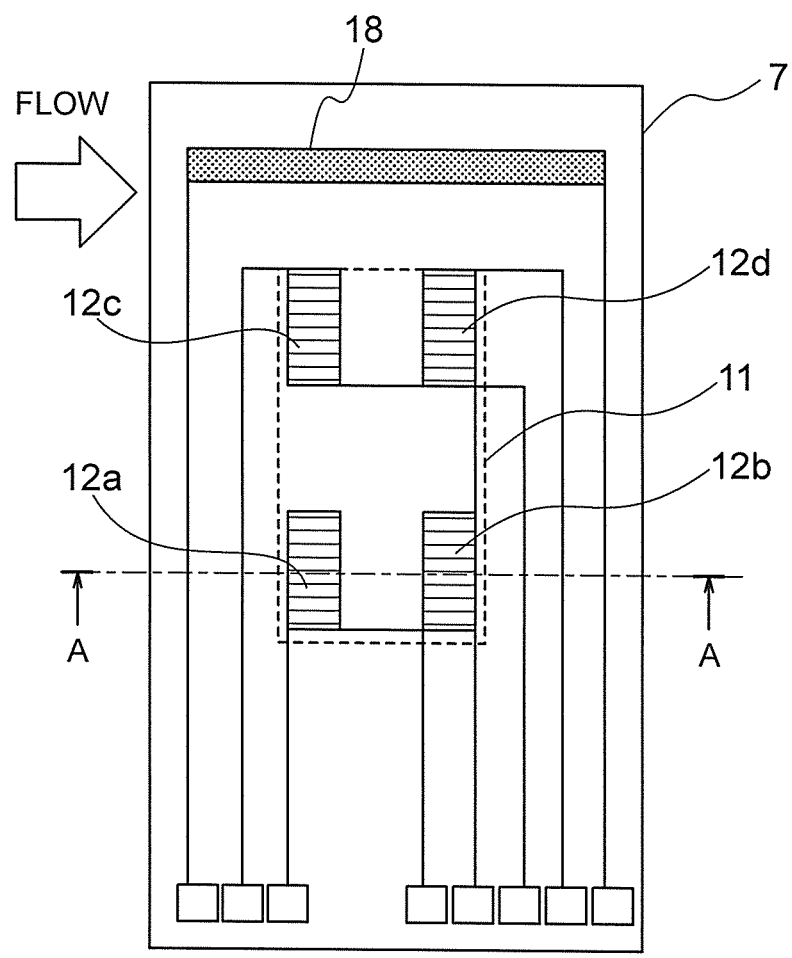
FIG. 19 is a plan view of a flow rate detection element in a seventh embodiment of the present invention.
Figure 20:
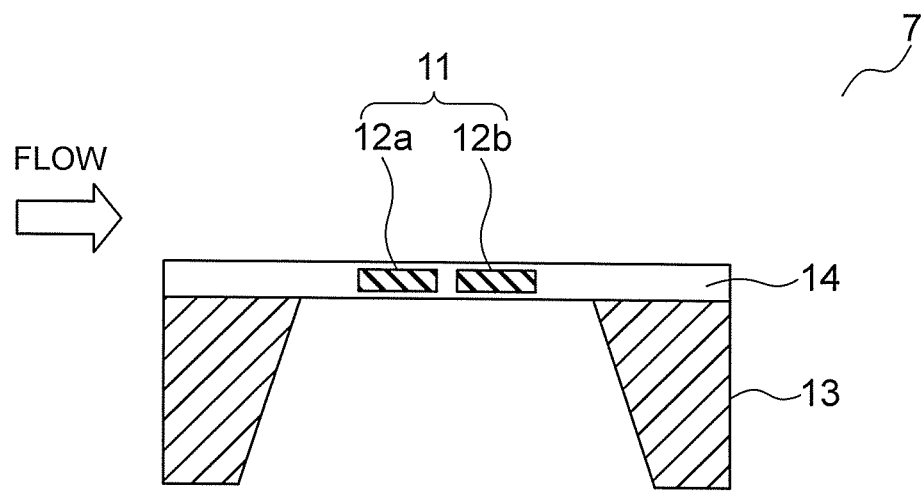
FIG. 20 is a sectional view as viewed from the direction indicated by the arrows A-A of FIG. 19.

FIG. 19 is a plan view of the flow rate detection element 7 in the seventh embodiment of the present invention. FIG. 20 is a sectional view as viewed from the direction indicated by the arrows A-A of FIG. 19.

In FIG. 19 and FIG. 20, the flow rate detection element 7 includes the detection portion 11, the resistor 18, the silicon substrate 13, and the insulating film 14, which is formed on the surface of the silicon substrate 13 to cover the detection portion 11 and the resistor 18. The detection portion 11 includes the resistor 12a, the resistor 12b, a third resistor for flow rate detection (hereinafter simply abbreviated as "resistor") 12c, and a fourth resistor for flow rate detection (hereinafter simply abbreviated as "resistor") 12d.

In the detection portion 11, four heat-sensitive resistors, namely, the resistor 12a, the resistor 12b, the resistor 12c, and the resistor 12d, are formed. With respect to the flow of the air, the resistor 12a and the resistor 12c are arranged on the upstream side, and the resistor 12b and the resistor 12d are arranged on the downstream side.

Further, the resistor 12a and the resistor 12b are arranged so as to be opposed to each other, and the resistor 12c and the resistor 12d are arranged so as to be opposed to each other. The two resistors arranged so as to be opposed to each other are arranged so as to be as close to each other as possible so that, as described later, when air flows, the air heated through exposure to one resistor is exposed to another resistor before the air is cooled down. The resistor 18 is arranged on a portion of the surface of the flow rate detection element 7 other than the portion of the detection portion 11.

Similarly to the above-mentioned first embodiment, the back surface side of the silicon substrate 13 is removed through etching, for example, and thus the layer in which the resistor 12a, the resistor 12b, the resistor 12c, and the resistor 12d are formed has a thin film structure.

Figure 21:
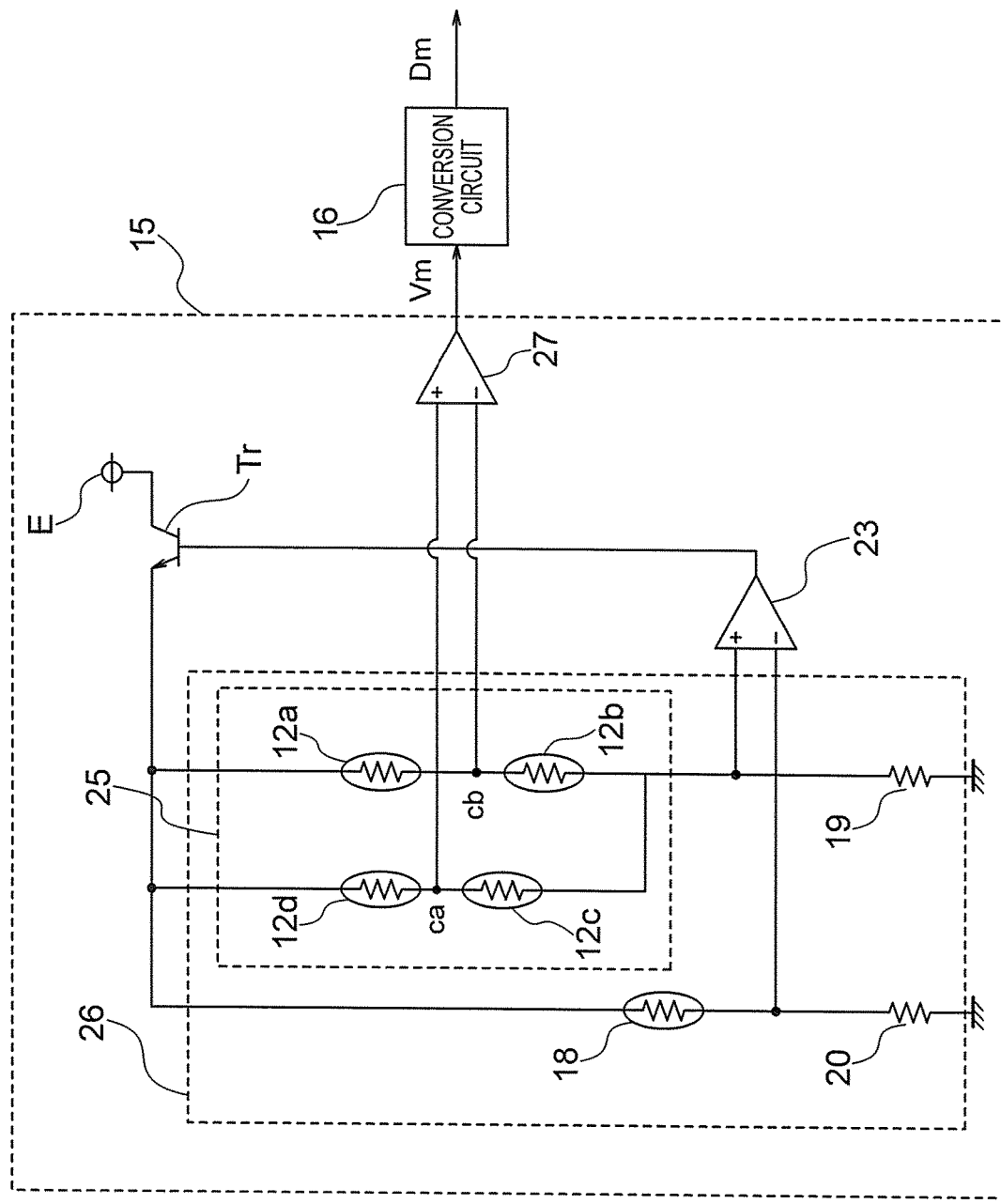
FIG. 21 is a circuit diagram for illustrating a configuration of a detection circuit in the seventh embodiment of the present invention.

Next, description is given of the configuration of the detection circuit 15 with reference to FIG. 21. FIG. 21 is a circuit diagram for illustrating the configuration of the detection circuit 15 in the seventh embodiment of the present invention.

In FIG. 21, the detection circuit 15 includes: the constant voltage source E; a first series circuit, which includes the fixed resistor 19 and a parallel circuit including the resistor 12a, the resistor 12b, the resistor 12c, and the resistor 12d; a second series circuit, which includes the resistor 18 and the fixed resistor 20; the operational amplifier 23; an operational amplifier 27; and the transistor Tr. The parallel circuit has a configuration in which the resistor 12a and the resistor 12b, which are connected in series to each other, and the resistor 12c and the resistor 12d, which are connected in series to each other, are connected in parallel to each other. The first series circuit has a configuration in which the parallel circuit and the fixed resistor 19 are connected in series to each other. The second series circuit has a configuration in which the resistor 18 and the fixed resistor 20 are connected in series to each other.

The non-inverting input terminal of the operational amplifier 23 is connected to a node of the parallel circuit and the fixed resistor 19, and the inverting input terminal of the operational amplifier 23 is connected to a node of the resistor 18 and the fixed resistor 20. A non-inverting input terminal of the operational amplifier 27 is connected to a node of the resistor 12c and the resistor 12d, and an inverting input terminal of the operational amplifier 27 is connected to a node of the resistor 12a and the resistor 12b.

The base side of the transistor Tr is connected to the output side of the operational amplifier 23, and the collector side of the transistor Tr is connected to the constant voltage source E. In each of the first series circuit and the second series circuit, one terminal is grounded and another terminal is connected to the emitter side of the transistor Tr.

A bridge circuit 25 corresponds to the above-mentioned parallel circuit, and includes the four resistors 12a to 12d. A bridge circuit 26 includes the bridge circuit 25, the resistor 18, the fixed resistor 19, and the fixed resistor 20.

As described later, a current flowing through the bridge circuit 26 is controlled so that the bridge circuit 26 is in a balanced state, that is, a potential difference between an intermediate point ca and an intermediate point cb becomes zero. The resistance values of the fixed resistor 19 and the fixed resistor 20 are set so that the temperature of the four resistors 12a to 12d becomes a predetermined temperature when the bridge circuit 26 is balanced.

In this configuration of the detection circuit 15, when air flowing in the forward flow direction flows over the detection portion 11, first, the resistor 12a and the resistor 12c, which are arranged on the upstream side, of the four resistors 12a to 12d have heat removed therefrom by the air, with the result that the resistance values thereof are reduced. Further, as the flow rate of the air increases, heat that is removed from the resistor 12a and the resistor 12c by the air increases. As a result, the decrease amount of the resistance values increases in proportion to the flow rate of the air.

Meanwhile, the resistor 12b and the resistor 12d are arranged on the downstream side, and hence are exposed to the air that is heated by the resistor 12a and the resistor 12c. Thus, the resistance values of the resistor 12b and the resistor 12d are hardly changed before and after the air flows. As a result, differences between voltages across both ends of each of the resistors 12a to 12d are generated. That is, when voltages across both ends of each of the resistor 12a and the resistor 12b, which are connected in series, are compared to each other, the voltage across both ends of the resistor 12a is smaller. Similarly, when voltages across both ends of each of the resistor 12c and the resistor 12d are compared to each other, the voltage across both ends of the resistor 12c is smaller.

Thus, the flow rate Qm can be detected by causing a potential difference generated between the intermediate point ca and the intermediate point cb of the bridge circuit 25 to be output as the analog signal Vm via the operational amplifier 27. In this case, the analog signal Vm output by the detection circuit 15 can be represented by the above-mentioned expression (2).

It is possible to change Vm shown in the expression (2) by adjusting a ratio (hereinafter referred to as "third ratio") of resistance values of the resistor 12a, the resistor 12b, the resistor 12c, and the resistor 12d, which are included in the bridge circuit 25.

That is, also when the detection circuit 15 has the configuration illustrated in FIG. 21, similarly to the above-mentioned first embodiment, the forward flow analog signal can be set to have a value larger than the missing input voltage range by adjusting the third ratio in advance. Consequently, even without changing the configuration of the conversion circuit 16, similarly to the above-mentioned first embodiment, the detection accuracy of the flow rate Qm can be enhanced only by changing the third ratio.

As described above, according to the flow rate detector of the seventh embodiment, in the detection circuit illustrated in FIG. 21, the forward flow analog signal is set to have a value larger than the missing input voltage range by adjusting the ratio of the resistance values of the first resistor for flow rate detection, the second resistor for flow rate detection, the third resistor for flow rate detection, and the fourth resistor for flow rate detection.

Also with this configuration, the same effects as those of the above-mentioned first embodiment can be obtained. Moreover, it is possible to achieve the flow rate detector that is more sensitive to changes of the flow rate of the air as compared to the above-mentioned first embodiment.

Eighth Embodiment

In an eighth embodiment of the present invention, description is given of the flow rate detector 1 further including the adjustment circuit 17 in addition to the configuration of the above-mentioned seventh embodiment. In the eighth embodiment, description of the same points as those of the above-mentioned seventh embodiment is omitted, and differences from the above-mentioned seventh embodiment are mainly described.

As a method of setting the forward flow analog signal to have a value larger than the missing input voltage range, the adjustment circuit 17 is included in the flow rate detector 1 in the eighth embodiment, while the third ratio is adjusted in the above-mentioned seventh embodiment.

Figure 22:
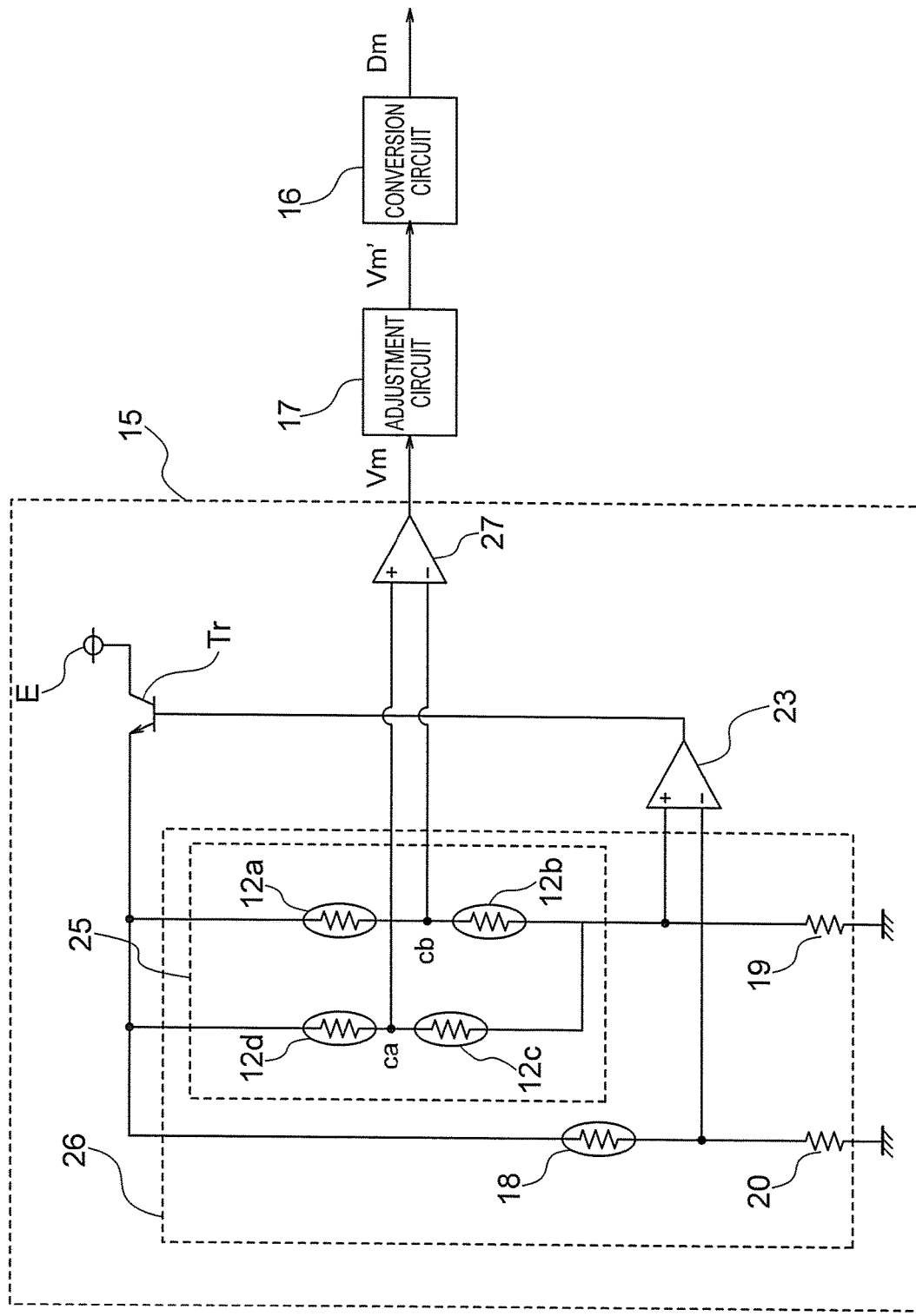
FIG. 22 is a block diagram for illustrating a configuration of a detection circuit, a conversion circuit, and an adjustment circuit in an eighth embodiment of the present invention.

FIG. 22 is a block diagram for illustrating a configuration of the detection circuit 15, the conversion circuit 16, and the adjustment circuit 17 in the eighth embodiment of the present invention.

In FIG. 22, the detection circuit 15 outputs the analog signal Vm to the adjustment circuit 17. The adjustment circuit 17 outputs the analog signal Vm' to the conversion circuit 16. The conversion circuit 16 converts the analog signal Vm' input from the adjustment circuit 17 to the digital signal Dm.

The configuration of the adjustment circuit 17 is the same as that of the above-mentioned second embodiment. Consequently, as illustrated in FIG. 22, similarly to the above-mentioned second embodiment, the forward flow analog signal can be set to have a value larger than the missing input voltage range by providing the adjustment circuit 17 to the configuration illustrated in FIG. 21.

As described above, the flow rate detector according to the eighth embodiment further includes the adjustment circuit in addition to the configuration of the above-mentioned seventh embodiment. The conversion circuit is configured to receive as input an analog signal output by the adjustment circuit instead of an analog signal output by the detection circuit to output a digital signal.

With this configuration, it is possible to set the forward flow analog signal to have a value larger than the missing input voltage range with use of the adjustment circuit without adjusting the third ratio by the detection circuit in advance. Further, the analog signal is to be adjusted in a subsequent stage of the detection circuit, and hence, as compared to the above-mentioned seventh embodiment, the analog signal input to the conversion circuit as well as a variation of the detection circuit can be adjusted with higher accuracy.

What is claimed is:

1. A flow rate detector, which is configured to detect a flow rate of air flowing through an intake pipe for introducing the air into an internal combustion engine, the flow rate detector comprising:
a bypass passage, which is configured to allow part of the air flowing through the intake pipe to flow therethough;
a detection circuit, which is configured to output as an analog signal a voltage in accordance with a flow rate of the air flowing through the intake pipe by dividing a reference voltage based on a magnitude of the flow rate and whether a flow direction of the air is a forward flow direction or a backward flow direction, the forward flow direction being a direction from the flow rate detector toward the internal combustion engine, the backward flow direction being a direction opposite from the forward flow direction; and
a conversion circuit, which is configured to receive as input the analog signal output by the detection circuit, and to convert the input analog signal into a digital code based on an analog-to-digital conversion characteristic to output the digital code obtained by conversion as a digital signal, the analog-to-digital conversion characteristic being a characteristic obtained by associating an input voltage input to the conversion circuit with the digital code output by the conversion circuit,
wherein a forward flow analog signal, which is the analog signal that corresponds to the forward flow direction and is input to the conversion circuit, is set to have a value larger than a missing input voltage range, which is an input voltage range in which a missing code is capable of occurring in the analog-to-digital conversion characteristic.

2. The flow rate detector according to claim 1, wherein the detection circuit includes:
a constant voltage source, which is configured to output the reference voltage; and
a series circuit, in which a first resistor for flow rate detection and a second resistor for flow rate detection are connected in series to each other,
wherein the series circuit includes one terminal that is grounded and another terminal that is connected to the constant voltage source, and
wherein the detection circuit is configured to output as the analog signal a voltage based on the first resistor for flow rate detection.

3. The flow rate detector according to claim 2, wherein the forward flow analog signal is set to have a value larger than the missing input voltage range by adjusting a ratio between a resistance value of the first resistor for flow rate detection and a resistance value of the second resistor for flow rate detection.

4. The flow rate detector according to claim 2, further comprising an adjustment circuit, which is configured to adjust the analog signal output by the detection circuit so that the forward flow analog signal has a value larger than the missing input voltage range to output the adjusted analog signal,
wherein the conversion circuit is configured to receive as input the analog signal output by the adjustment circuit instead of the analog signal output by the detection circuit to output the digital signal.

5. The flow rate detector according to claim 1, wherein the detection circuit includes:
a constant voltage source, which is configured to output the reference voltage;

a first series circuit, in which a first fixed resistor and a second fixed resistor are connected in series to each other;

a second series circuit, in which a first resistor for flow rate detection and a second resistor for flow rate detection are connected in series to each other;

an operational amplifier, which includes a non-inverting input terminal connected to a node of the first fixed resistor and the second fixed resistor and an inverting input terminal connected to a node of the first resistor for flow rate detection and the second resistor for flow rate detection; and a resistor for air temperature detection, which includes one terminal connected to the inverting input terminal side of the operational amplifier and another terminal connected to an output side of the operational amplifier, wherein each of the first series circuit and the second series circuit includes one terminal that is grounded and another terminal that is connected to the constant voltage source, and wherein the detection circuit is configured to output, as the analog signal, output of the operational amplifier.

6. The flow rate detector according to claim 5, wherein the forward flow analog signal is set to have a value larger than the missing input voltage range by adjusting a ratio between a resistance value of the first resistor for flow rate detection and a resistance value of the second resistor for flow rate detection.

7. The flow rate detector according to claim 5, further comprising an adjustment circuit, which is configured to adjust the analog signal output by the detection circuit so that the forward flow analog signal has a value larger than the missing input voltage range to output the adjusted analog signal, wherein the conversion circuit is configured to receive as input the analog signal output by the adjustment circuit instead of the analog signal output by the detection circuit to output the digital signal.

8. The flow rate detector according to claim 1, wherein the detection circuit includes:

a constant voltage source, which is configured to output the reference voltage;

a first series circuit, in which a first fixed resistor, a first resistor for air temperature detection, a second resistor for air temperature detection, and a second fixed resistor are connected in series to one another;

a second series circuit, in which a third fixed resistor, a first resistor for temperature detection, and a second resistor for temperature detection are connected in series to one another;

a third series circuit, in which a fourth fixed resistor and a resistor for flow rate detection are connected in series to each other;

an operational amplifier, which includes a non-inverting input terminal connected to a node of the first resistor for temperature detection and the second resistor for temperature detection and an inverting input terminal connected to a node of the first resistor for air temperature detection and the second resistor for air temperature detection; and a transistor, which includes a base connected to an output side of the operational amplifier and a collector connected to the constant voltage source, wherein each of the first series circuit, the second series circuit, and the third series circuit includes one terminal that is grounded and another terminal that is connected to an emitter side of the transistor, and wherein the detection circuit is configured to output a voltage based on the fourth fixed resistor as the analog signal.

9. The flow rate detector according to claim 8, wherein the forward flow analog signal is set to have a value larger than the missing input voltage range by adjusting a ratio of a resistance value of the first resistor for air temperature detection, a resistance value of the second resistor for air temperature detection, a resistance value of the first fixed resistor, and a resistance value of the second fixed resistor.

10. The flow rate detector according to claim 8, further comprising an adjustment circuit, which is configured to adjust the analog signal output by the detection circuit so that the forward flow analog signal has a value larger than the missing input voltage range output the adjusted analog signal, wherein the conversion circuit is configured to receive as input the analog signal output by the adjustment circuit instead of the analog signal output by the detection circuit to output the digital signal.

11. The flow rate detector according to claim 1, wherein the detection circuit includes:

a constant voltage source, which is configured to output the reference voltage;

a first series circuit, in which a first fixed resistor and a parallel circuit are connected in series to each other, the parallel circuit having a configuration in which a first resistor for flow rate detection and a second resistor for flow rate detection, which are connected in series to each other, and a third resistor for flow rate detection and a fourth resistor for flow rate detection, which are connected in series to each other, are connected in parallel to each other;

a second series circuit, in which a resistor for air temperature detection and a second fixed resistor are connected in series to each other;

a first operational amplifier, which includes a non-inverting input terminal connected to a node of the parallel circuit and the first fixed resistor and an inverting input terminal connected to a node of the resistor for air temperature detection and the second fixed resistor;

a second operational amplifier, which includes a non-inverting input terminal connected to a node of the third resistor for flow rate detection and the fourth resistor for flow rate detection and an inverting input terminal connected to a node of the first resistor for flow rate detection and the second resistor for flow rate detection; and a transistor, which includes a base connected to an output side of the first operational amplifier and a collector connected to the constant voltage source, wherein each of the first series circuit and the second series circuit includes one terminal that is grounded and another terminal that is connected to an emitter side of the transistor, and wherein the detection circuit is configured to output, as the analog signal, output of the second operational amplifier.

12. The flow rate detector according to claim 11, wherein the forward flow analog signal is set to have a value larger than the missing input voltage range by adjusting a ratio of a resistance value of the first resistor for flow rate detection, a resistance value of the second resistor for flow rate detection, a resistance value of the third resistor for flow rate detection, and a resistance value of the fourth resistor for flow rate detection.

13. The flow rate detector according to claim 11, further comprising an adjustment circuit, which is configured to adjust the analog signal output by the detection circuit so that the forward flow analog signal has a value larger than the missing input voltage range to output the adjusted analog signal,
   wherein the conversion circuit is configured to receive as input the analog signal output by the adjustment circuit instead of the analog signal output by the detection circuit to output the digital signal.

* * * * *